(12) United States Patent
Sakaguchi et al.

(10) Patent No.: US 9,946,351 B2
(45) Date of Patent: Apr. 17, 2018

(54) EMPATHETIC USER INTERFACE, SYSTEMS, AND METHODS FOR INTERFACING WITH EMPATHETIC COMPUTING DEVICE

(71) Applicant: SomniQ, Inc., Menlo Park, CA (US)

(72) Inventors: Rikko Sakaguchi, Menlo Park, CA (US); Hidenori Ishikawa, Los Altos, CA (US); Takuya Nishimoto, Hiroshima (JP); Ken Yano, Tokyo (JP)

(73) Assignee: SomniQ, Inc., Sunnyvale, CA (US)

( * ) Notice: Subject to any disclaimer, the term of this patent is extended or adjusted under 35 U.S.C. 154(b) by 32 days.

(21) Appl. No.: 15/046,001

(22) Filed: Feb. 17, 2016

(65) Prior Publication Data

US 2016/0246373 A1 Aug. 25, 2016

Related U.S. Application Data

(60) Provisional application No. 62/119,608, filed on Feb. 23, 2015.

(51) Int. Cl.
*G06F 3/01* (2006.01)
*G06F 3/16* (2006.01)

(52) U.S. Cl.
CPC ............ *G06F 3/016* (2013.01); *G06F 3/011* (2013.01); *G06F 3/017* (2013.01); *G06F 3/16* (2013.01)

(58) Field of Classification Search
None
See application file for complete search history.

(56) References Cited

U.S. PATENT DOCUMENTS

| | | |
|---|---|---|
| D221,818 S | 9/1971 | Chardack |
| D249,091 S | 8/1978 | Burtis |
| D262,464 S | 12/1981 | Vernon, Jr. |
| D286,124 S | 10/1986 | Dempsey |

(Continued)

FOREIGN PATENT DOCUMENTS

| | | |
|---|---|---|
| JP | S59132718 | 7/1984 |
| JP | H11232012 | 8/1999 |

(Continued)

OTHER PUBLICATIONS

International Search Report and Written Opinion received for PCT/US2016/018271 dated Jun. 8, 2016.

(Continued)

*Primary Examiner* — Joseph Haley
(74) *Attorney, Agent, or Firm* — Dorsey & Whitney LLP

(57) ABSTRACT

Devices, systems, and methods for empathetic computing are described. A method of interfacing with an empathetic computing system may include the steps of receiving sensor data from sensors of an empathetic computing device, wherein the sensor data is generated by user interaction with the empathetic computing device, the user interaction comprising a plurality of interaction units, receiving contextual information associated with the user interaction, classifying the sensor data as a sequence of interaction units using stored associations between exemplary sensor data and pre-determined interaction units, and providing feedback with the empathetic computing device, wherein the feedback is based, at least in part, on the sequence of interaction units and the contextual information.

63 Claims, 19 Drawing Sheets

(56) References Cited

U.S. PATENT DOCUMENTS

| | | |
|---|---|---|
| D297,328 S | 8/1988 | Nozo et al. |
| 4,804,945 A | 2/1989 | Millet |
| D303,356 S | 9/1989 | Couch |
| D324,106 S | 2/1992 | Greenblatt |
| D325,582 S | 4/1992 | Emmons et al. |
| D327,690 S | 7/1992 | Ogawa et al. |
| D331,060 S | 11/1992 | Emmons et al. |
| 5,243,430 A | 9/1993 | Emmons |
| D339,986 S | 10/1993 | Garouste et al. |
| D345,507 S | 3/1994 | Granai |
| D363,569 S | 10/1995 | Lai |
| D382,255 S | 8/1997 | Moffatt |
| D382,261 S | 8/1997 | Kaneko et al. |
| D396,852 S | 8/1998 | Chao |
| D408,285 S | 4/1999 | Favre |
| D408,590 S | 4/1999 | Litton |
| D414,190 S | 9/1999 | Pinchuk |
| D418,125 S | 12/1999 | Jobs et al. |
| D430,358 S | 8/2000 | Papiernik |
| D433,994 S | 11/2000 | Jobs et al. |
| D443,726 S | 6/2001 | Faillant-Dumas |
| D443,727 S | 6/2001 | Faillant-Dumas |
| D463,991 S | 10/2002 | Curry et al. |
| D465,469 S | 11/2002 | Heath |
| D465,733 S | 11/2002 | Hill |
| D467,037 S | 12/2002 | Bakic |
| 6,558,165 B1 | 5/2003 | Curry |
| D479,366 S | 9/2003 | Goswell |
| D480,396 S | 10/2003 | Buckner |
| D489,706 S | 5/2004 | Chen |
| D494,633 S | 8/2004 | Nussberger et al. |
| D496,004 S | 9/2004 | Borsboom |
| D503,692 S | 4/2005 | Basta |
| D518,030 S | 3/2006 | Lin |
| D518,819 S | 4/2006 | Gray |
| D521,512 S | 5/2006 | Kunzi et al. |
| D526,916 S | 8/2006 | Oas |
| D527,008 S | 8/2006 | Greenrod |
| D541,228 S | 4/2007 | Thursfield |
| D558,767 S | 1/2008 | Solland |
| D561,022 S | 2/2008 | Terrasi |
| D578,711 S | 10/2008 | Burrow et al. |
| D579,937 S | 11/2008 | Cohen |
| D595,670 S | 7/2009 | Glassman et al. |
| D595,734 S | 7/2009 | Son |
| D596,815 S | 7/2009 | Baek |
| D597,524 S | 8/2009 | Jha |
| D601,564 S | 10/2009 | Maeno |
| D602,858 S | 10/2009 | Ellis et al. |
| D602,915 S | 10/2009 | Song et al. |
| D602,916 S | 10/2009 | Won |
| D606,973 S | 12/2009 | Jha |
| D607,347 S | 1/2010 | Goh et al. |
| D610,479 S | 2/2010 | Shi |
| D619,562 S | 7/2010 | Jha |
| D626,147 S | 10/2010 | Goddard |
| D627,306 S | 11/2010 | Charleux |
| D628,190 S | 11/2010 | Jha |
| D632,265 S | 2/2011 | Choi et al. |
| D632,281 S | 2/2011 | Hoehn et al. |
| D636,380 S | 4/2011 | Valeur |
| D636,760 S | 4/2011 | Cheng |
| D637,306 S | 5/2011 | Feuerabend et al. |
| D643,412 S | 8/2011 | Brady et al. |
| 8,089,458 B2 | 1/2012 | Barney et al. |
| D654,866 S | 2/2012 | Rautiainen |
| D656,034 S | 3/2012 | Wanders |
| D672,465 S | 12/2012 | Sherman |
| D683,636 S | 6/2013 | Levanen |
| D683,843 S | 6/2013 | Cudworth |
| D685,790 S | 7/2013 | Tang |
| D687,009 S | 7/2013 | Song et al. |
| D695,258 S | 12/2013 | Hauser et al. |
| D700,080 S | 2/2014 | Broadbent et al. |
| D700,571 S | 3/2014 | Guccione et al. |
| D700,904 S | 3/2014 | Miller et al. |
| D717,674 S | 11/2014 | Vu et al. |
| D719,165 S | 12/2014 | Hill et al. |
| D724,060 S | 3/2015 | Ahn et al. |
| D726,924 S | 4/2015 | Tseng et al. |
| D729,773 S | 5/2015 | Salojarvi et al. |
| D730,891 S | 6/2015 | Wang |
| D731,334 S | 6/2015 | Fiedler et al. |
| D731,579 S | 6/2015 | Bart et al. |
| D732,033 S | 6/2015 | Sakaguchi |
| D738,376 S | 9/2015 | Sakaguchi |
| D743,645 S | 11/2015 | Lee |
| 9,189,090 B2 | 11/2015 | Tanaka |
| 9,218,055 B2 | 12/2015 | Sakaguchi et al. |
| D746,886 S | 1/2016 | Breazeal et al. |
| D747,984 S | 1/2016 | Zhao et al. |
| D752,531 S | 3/2016 | Xu et al. |
| D755,750 S | 5/2016 | Chen |
| D756,955 S | 5/2016 | Wagner |
| D763,967 S | 8/2016 | Kujawski et al. |
| D768,114 S | 10/2016 | Hou et al. |
| D769,846 S | 10/2016 | Hong et al. |
| D770,417 S | 11/2016 | Chen |
| D773,947 S | 12/2016 | Scarcella et al. |
| D774,717 S | 12/2016 | Choi et al. |
| D776,820 S | 1/2017 | Rouillac et al. |
| D777,331 S | 1/2017 | Jayalath et al. |
| D778,876 S | 2/2017 | Zhang |
| D778,878 S | 2/2017 | De Vaal |
| D783,838 S | 4/2017 | Zhao et al. |
| 2002/0055383 A1 | 5/2002 | Onda et al. |
| 2004/0250218 A1 | 12/2004 | Wecker et al. |
| 2006/0028429 A1 | 2/2006 | Kanevsky et al. |
| 2007/0135689 A1 | 6/2007 | Masamichi et al. |
| 2007/0247439 A1 | 10/2007 | Daniel et al. |
| 2009/0021380 A1 | 1/2009 | Higuchl et al. |
| 2010/0123588 A1 | 5/2010 | Cruz Hernandez |
| 2010/0144436 A1 | 6/2010 | Marks et al. |
| 2012/0062483 A1 | 3/2012 | Ciesla et al. |
| 2012/0280917 A1 | 11/2012 | Toksvig et al. |
| 2013/0063611 A1 | 3/2013 | Papakipos et al. |
| 2014/0112556 A1* | 4/2014 | Kalinli-Akbacak .... G10L 25/63 382/128 |
| 2014/0139466 A1 | 5/2014 | Sakaguchi et al. |
| 2014/0285435 A1 | 9/2014 | Bezos |
| 2014/0324749 A1* | 10/2014 | Peters ...................... G09B 7/04 706/46 |
| 2015/0268737 A1 | 9/2015 | Gelfond et al. |
| 2016/0062496 A1 | 3/2016 | Sakaguchi et al. |
| 2017/0168595 A1 | 6/2017 | Sakaguchi et al. |

FOREIGN PATENT DOCUMENTS

| | | |
|---|---|---|
| JP | 2001-025984 A | 1/2001 |
| JP | 2007034544 | 2/2007 |
| JP | 2007058844 | 3/2007 |
| JP | 2009026125 | 2/2009 |
| JP | 2012075089 | 4/2012 |
| JP | 2012509145 | 4/2012 |
| KR | 2009-0093286 | 9/2009 |
| KR | 2012-0092316 | 8/2012 |
| WO | 0237249 A2 | 5/2002 |
| WO | 2007034388 A2 | 3/2007 |
| WO | 2009036327 A1 | 3/2009 |
| WO | 2013055380 A1 | 4/2013 |
| WO | 2016137797 A1 | 9/2016 |
| WO | 2017100641 A1 | 6/2017 |

OTHER PUBLICATIONS

U.S. Appl. No. 29/548,309, entitled "Portable Electronic Device", filed Dec. 11, 2015.
U.S. Appl. No. 15/373,989, entitled "Apparatus, System, and Methods for Interfacing With a User and/or External Apparatus by Stationary State Detection", filed Dec. 9, 2016.

(56) References Cited

OTHER PUBLICATIONS

Cai, Yang, "Empathic Computing", Ambient Intelligence in Everyday Life, LNAI 3864, Jan. 2006, 67-95.

* cited by examiner

FIG. 4

| SYMBOL | NAME | COLOR | DEFINITION | IMPLICATIONS / MEANINGS | SITUATION / CONDITIONS THE MOMENT IS CREATED WHEN: |
|---|---|---|---|---|---|
| O | OPEN | YELLOW | MOMENT BEFORE THE MUTUAL COMMUNICATION WITH ABOT NEARBY | BEING OPEN-MINDED TO COMMUNICATION WITH ABOT | WHEN ABOT IS MOVED OFF ITS OWN PLACE AND STAYING NEARBY YOU |
| B | BE | LIME GREEN | MOMENT BEFORE TOUCH ABOT DURING ABOT'S EXPRESSION | BEING CLOSE, AWARE OF ABOT EXPRESSING ITSELF BEFORE TOUCHING | WHEN YOU TAKE UP ABOT FROM TABLE DURING ITS EXPRESSIONS |
| T | TOUCH | LIGHT YELLOW | MOMENT OF TAKING UP ABOT AND BEING IN TOUCH ON PALM | BEING IN TOUCH WITH ABOT, IN CALM STABLE CONDITION | WHEN YOU TAKE UP ABOT, FITTING INTO YOUR PALM, HORIZONTALLY OR HOLDING |
| S | SMILE | PINK | MOMENT OF MUTUAL COMMUNICATION IN FACE-TO-FACE POSITION | FEELING MUTUAL BY GREETING AND INTERACTING IN A POSITION | WHEN YOU MOVE YOUR HAND TO SEE ABOT'S FACE AND KEEP IT FOR MOMENTS |
| F | FEEL | LIGHT BLUE | MOMENT OF VOCALIZING WHAT'S ON MIND AND VIEWING ABOT'S ECHOES | VOCALIZING SOMETHING AT THE MOMENT INNER FEELING | WHEN YOU UTTER YOUR VOICE OR MAKE A SOUND ON A [TOUCH] POSITION |
| R | BREATHE | GREEN | MOMENT OF KEEPING HORIZONTAL STILLNESS WITH THE RHYTHM OF ABOT | KEEPING CALM AND STILL TIME, WITH A RHYTHM OF BREATHING | WHEN YOU OPEN OR KEEPING STILL POSITION HOLDING ABOT OR KEEP HORIZONTAL STILL AND |
| C | CALM | WHITE | MOMENT WITH HAND'S HORIZONTAL STILLNESS WITH QUIETNESS | KEEPING CALM, STILL, QUIET AND CREATING A MINDFUL SPACE | WHEN YOU KEEP HORIZONTAL STILL AND QUIET CONDITION IN [TOUCH] POSITION |
| W | WISH | BLUE | MOMENT OF VOCALIZING WHAT'S ON MIND AFTER REACHING [CALM] | VOCALIZING INNER FEELING, THOUGHTS, LIKE A SELF-TALKING | WHEN YOU UTTER YOUR VOICE OR MAKE A SOUND IN [CALM] POSITION |
| H | HEED | ICE BLUE | MOMENT OF MARKING THE EMPATHEME [WISH SEED] JUST MADE BY HOLDING | A SIMPLE REFLECTION WHAT'S JUST VOCALIZED, TO MARK IT | WHEN YOU TOUCH ABOT AROUND ITS BODY BY GENTLY HOLDING AFTER [WISH] |
| D | DIEM | PURPLE | MOMENT OF REVIEWING THE EMPATHEME EXPRESSIONS OF TODAY | A SIMPLE REFLECTION OF A SET OF EMPATHEME STRINGS BY REVIEWING EMPATHEMES | WHEN YOU COMPLETELY COVER ABOT WITH BOTH HANDS, IN [CALM] POSITION |
| I | IMA | RED | MOMENT OF REVIEWING THE EMPATHEME STRING JUST MADE NOW | A SIMPLE REFLECTION OF HOW YOU JUST CREATED EMPATHEME STRING | WHEN YOU PUT DOWN ABOT ON THE TABLE AFTER SOME EMPATHEMES MADE |
| G | GROW | LIGHT GREEN | MOMENT OF VIEWING ABOT'S REFLECTIVE EXPRESSIONS ON PREVIOUS [NURTURES] | A SIMPLE REFLECTION ON A SET OF EMPATHEME STRINGS JUST MADE | WHEN YOU PUT DOWN ABOT ON ITS OWN PLACE AND VIEW ITS REFLECTION |
| M | DREAM | ORANGE | MOMENT OF RESPONDING TO ABOT'S REFLECTIVE EXPRESSIONS ON [NURTURES] | A SIMPLE REFLECTION OF A SET OF EMPATHEME STRINGS JUST MADE | WHEN YOU RESPOND TO ABOT MAKING REFLECTIVE EXPRESSIONS ON ITS PLACE |
| N | WONDER | LAVENDER | MOMENT OF RESPONDING TO ABOT'S REFLECTIVE EXPRESSIONS FROM HISTORY | A RECURSIVE COMMUNICATION REGARDING YOUR EMPATHEMES | WHEN YOU VIEW ABOT MAKING REFLECTIVE EXPRESSIONS FROM TIME TO TIME |
| P | PASSAGE | LIGHT ORANGE | MOMENT OF RESPONDING TO ABOT'S REFLECTIVE EXPRESSIONS | A RECURSIVE COMMUNICATION REGARDING EMPATHEMES OF OTHERS | WHEN YOU VIEW ABOT MAKING REFLECTIVE EXPRESSIONS FROM TIME TO TIME |

| INTERACTION UNIT | EXEMPLARY SENSOR DATA |
|---|---|
| OPEN | SENSOR DATA INDICATIVE OF USER IN PROXIMITY |
| BE | SENSOR DATA INDICATIVE OF USER REMAINING IN PROXIMITY FOR AT LEAST A THRESHOLD PERIOD OF TIME |
| TOUCH | SENSOR DATA INDICATIVE OF USER CONTACT WITH A BOTTOM SURFACE OF ABOT |
| SMILE | SENSOR DATA INDICATIVE OF MOVEMENT OF USER'S FACE TOWARDS ABOT'S CAMERA |
| FEEL | SOUND DATA INDICATIVE OF SOUND IN COMBINATION WITH SENSOR DATA INDICATIVE OF TOUCH |
| BREATHE | SENSOR DATA INDICATIVE OF USER CONTACT WITH BOTTOM SURFACE OF ABOT AND SENSOR DATA INDICATIVE OF MOVEMENT OF USER'S FINGER(S) AWAY FROM ABOT |
| CALM | SENSOR DATA INDICATIVE OF USER HOLDING ABOT IN A HORIZONTAL, STILL POSITION |
| WISH | SENSOR DATA INDICATIVE OF DETECTED VOCALIZATION FOLLOWING SENSOR DATA INDICATIVE OF USER HOLDING ABOT IN A HORIZONTAL STILL POSITION |
| HEED | SENSOR DATA INDICATIVE OF MOVEMENT OF USER'S FINGERS TOWARDS ABOT FOLLOWING "WISH" |
| DIEM | SENSOR DATA INDICATIVE OF ENCLOSING ABOT WITH USER'S HANDS |
| IMA | SENSOR DATA INDICATIVE OF PLACING ABOT BACK ONTO SUPPORT SURFACE |
| GROW | SENSOR DATA INDICATIVE OF PLACING ABOT BACK ONTO SUPPORT SURFACE FOLLOWED BY SENSOR DATA INDICATIVE OF USER OBSERVING FEEDBACK FROM ABOT |
| DREAM | SENSOR DATA INDICATIVE OF ABOT REMAINING IN PLACE (ON A SUPPORT SURFACE) |
| WONDER | SENSOR DATA INDICATIVE OF USER REMAINING IN PROXIMITY FOR A TIME GREATER THAN A PREDETERMINED DURATION IN COMBINATION WITH A DETECTED CHANGE IN USER EXPRESSION |
| PASSAGE | SENSOR DATA INDICATIVE OF USER REMAINING IN PROXIMITY FOR A TIME GREATER THAN A PREDETERMINED DURATION WITHOUT USER ENGAGING IN FURTHER USER INTERACTION |

CHOOSING SEEDS THAT THE USER TALKED NICELY

| DATE & TIME | EMPATHEME | EMPATHEME STRING | CLOSENESS | CLEARNESS | CALMNESS | WAVE FILE | SEED DURATION | GMM | TRANSCRIPT | SYLLABLE | TIME PER SYLLABLE |
|---|---|---|---|---|---|---|---|---|---|---|---|
| 6/3/15 16:43 | WI | TFFCWCW | 66 | 100 | 24 | 2015.0603.164326.WAV | 4.31 | ADULT | WANT TODAY TO BE A PRODUCTIVE DAY, IMPORTANT MEETING | 16 | 0.269 |
| 6/3/15 16:43 | WI | TFFCWCW | 66 | 100 | 24 | 2015.0603.164341.WAV | 3.46 | ADULT | I'M LITTLE ANXIOUS ABOUT THIS AFTERNOON'S MEETING | 14 | 0.247 |
| 6/4/15 15:32 | WI | BTCSTCWWCWWWNCWWWNCWCWCCCRRRI | 235 | 100 | 42 | 2015.0604.153201.WAV | 1.63 | ADULT | YESTERDAY WAS STRESSFUL | 6 | 0.272 |
| 6/4/15 15:32 | WI | BTCSTCWWCWWWNCWWWNCWCWCCCRRRRI | 235 | 100 | 42 | 2015.0604.153209.WAV | 1.94 | ADULT | TODAY IS GOING TO BE A GOOD DAY | 9 | 0.216 |
| 6/4/15 15:32 | WI | BTCSTCWWCWWWNCWWWNCWCWCCCRRRRI | 235 | 100 | 42 | 2015.0604.153236.WAV | 1.57 | ADULT | I AM FORTUNATE | 4 | 0.393 |
| 6/4/15 15:33 | WI | BTCSTCWWCWWWNCWWWNCWCWCCCRRRRI | 244 | 100 | 42 | 2015.0604.153244.WAV | 1.45 | ADULT | I AM THANKFUL FOR THE MANY GIFTS I HAVE BEEN GIVEN | 14 | 0.104 |
| 6/15/15 17:09 | WI | BTCCCRRRFCWWWMWWWFFFI | 244 | 94 | 24 | 2015.0615.170933.WAV | 2.22 | ADULT | ALWAYS WANT TO THINK POSITIVELY | 10 | 0.222 |
| 6/15/15 17:10 | WI | BTCCCRRRFCWWWMWWWFFFI | 244 | 94 | 24 | 2015.0615.170948.WAV | 3.17 | ADULT | KNOW I CAN DO ANYTHING I PUT MY MIND TO | 14 | 0.226 |
| 6/15/15 17:10 | WI | BTCCCRRRFCWWWMWWWFFFI | 244 | 94 | 24 | 2015.0615.171007.WAV | 1.51 | ADULT | I'M DRIVEN TO SUCCEED | 5 | 0.302 |
| 6/15/15 17:10 | WI | BTCCCRRRFCWWWMWWWFFFI | 244 | 94 | 24 | 2015.0615.171018.WAV | 1.74 | ADULT | IT'S IMPORTANT TO SUCCEED | 6 | 0.290 |
| 6/15/15 17:10 | WI | TCCCWWWWCWCWCWCWWNWCWWNCWWWNCWWWWC | 294 | 95 | 13 | 2015.0615.171031.WAV | 2.48 | ADULT | WILLING TO PAY THE PRICE TO SUCCEED | 8 | 0.310 |
| 6/15/15 17:15 | WI | TCCCWWWWCWCWCWCWWNWCWWNCWWWNCWWWWC | 294 | 95 | 13 | 2015.0615.171514.WAV | 1.74 | ADULT | LIKE BEING PHYSICALLY ACTIVE | 9 | 0.193 |
| 6/15/15 17:15 | WI | TCCCWWWWCWCWCWCWWNWCWWNCWWWNCWWWWC | 294 | 95 | 13 | 2015.0615.171522.WAV | 1.55 | ADULT | LIKE BEING PRODUCTIVE | 6 | 0.258 |
| 6/15/15 17:15 | WI | TCCCWWWWCWCWCWCWWNWCWWNCWWWNCWWWWC | 294 | 95 | 13 | 2015.0615.171533.WAV | 1.73 | ADULT | NEED TO LIVE IN THE MOMENT MORE OFTEN | 10 | 0.173 |
| 6/15/15 17:15 | WI | TCCCWWWWCWCWCWCWWNWCWWNCWWWNCWWWWC | 294 | 95 | 13 | 2015.0615.171544.WAV | 3.32 | ADULT | WANT TO WIN THE WIMBLEDON | 8 | 0.415 |
| 6/15/15 17:16 | WI | TCCCWWWWCWCWCWCWWNWCWWNCWWWNCWWWWC | 294 | 95 | 13 | 2015.0615.171556.WAV | 1.95 | ADULT | NEED TO BE REFLECTIVE | 6 | 0.325 |
| 6/15/15 17:16 | WI | TCCCWWWWCWCWCWCWWNWCWWNCWWWNCWWWWC | 294 | 95 | 13 | 2015.0615.171607.WAV | 2.84 | ADULT | WHAT CAN YOU TELL ME ABOUT ME? | 8 | 0.355 |

FIG. 16

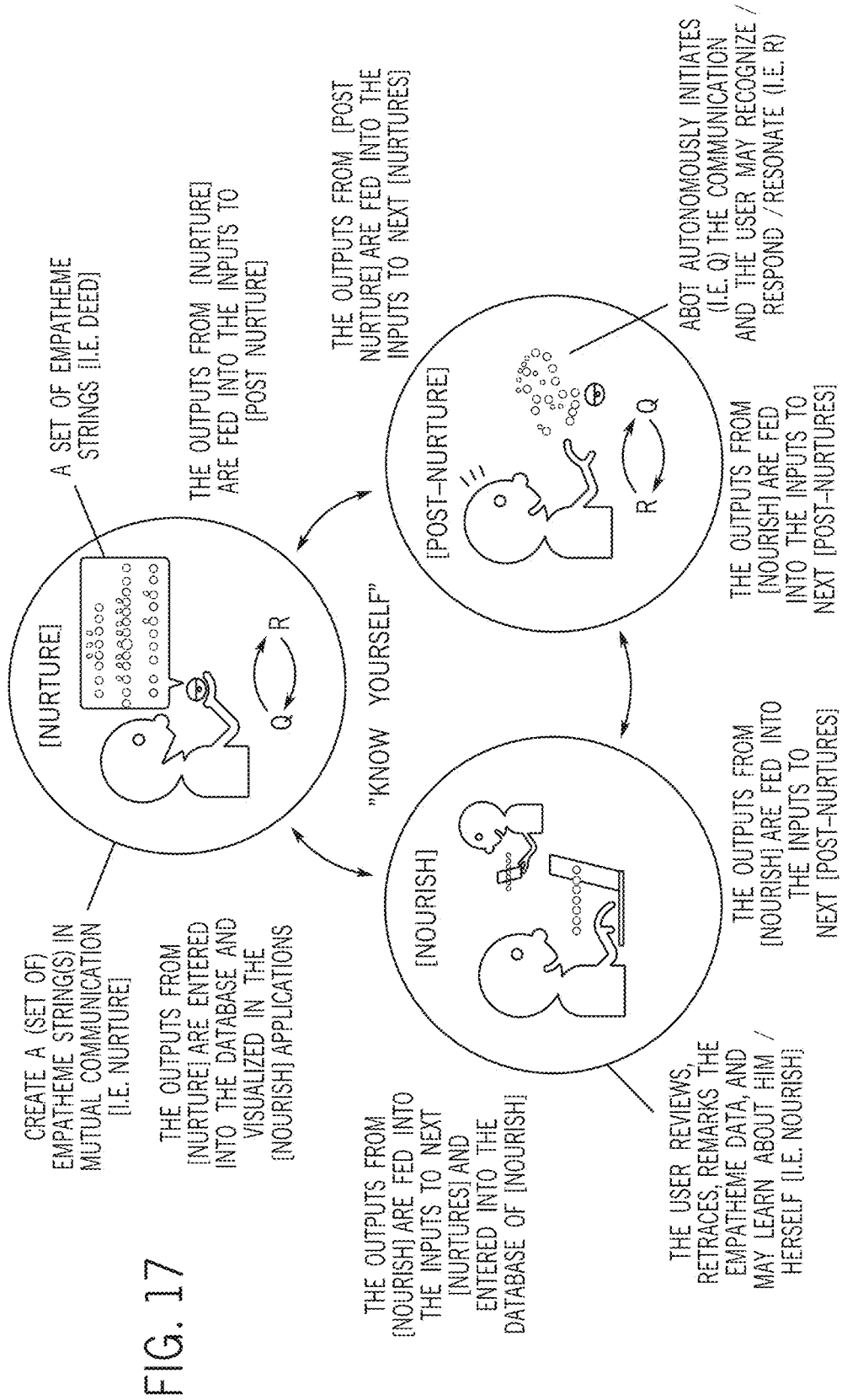

EMPATHETIC USER INTERFACE, SYSTEMS, AND METHODS FOR INTERFACING WITH EMPATHETIC COMPUTING DEVICE

This application claims priority to U.S. Provisional Application No. 62/119,608 filed Feb. 23, 2015, which application is incorporated herein by reference, in its entirety, for any purpose.

TECHNICAL FIELD

Examples described herein relate generally to empathetic computing systems, such as computing systems having an empathetic interface for interfacing with a user.

BACKGROUND

Computing systems have become ubiquitous in our daily lives. A user interacts with a computing system (e.g., a computer) through a user interface, which is typically a graphical user interface. Graphical user interfaces of currently known computing systems typically necessitate use of certain hardware, such as keyboards, pointer devices (e.g., mice, trackpads, and the like), monitors, and more recently touch screen interfaces, in order to enable the user to interact with the machine (e.g. computer). For example, a user may be required to push a button on a keyboard or a pointer device or tactually input specific information via a touch screen interface in order to effect a communication or interaction with the computer. Correspondingly, information is communicated back to the user typically graphically on a computer monitor (e.g. an LCD screen or similar display devices). Use of conventional user interfaces accordingly requires explicit commands to be provided by entering specific information on an input device. Computing systems generally are unable to interact seamlessly with users by, for example, reacting to natural movements of users.

SUMMARY

Examples described herein relate generally to empathetic computing systems, such as computing systems having an empathetic interface for interfacing with a user. According to some examples, a method of interfacing with an empathetic computing system may include receiving sensor data from sensors of an empathetic computing device, wherein the sensor data is generated by user interaction with the empathetic computing device, the user interaction comprising a plurality of interaction units, receiving contextual information associated with the user interaction, classifying the sensor data as a sequence of interaction units using stored associations between exemplary sensor data and pre-determined interaction units, and providing feedback with the empathetic computing device, wherein the feedback is based, at least in part, on the sequence of interaction units and the contextual information.

According to some examples, an empathetic computing device may include a processor, a plurality of sensors configured to generate sensor data based on user interaction with the empathetic computing device, the user interaction comprising a plurality of interaction units, and a memory operatively coupled to the plurality of sensors and the processor, the memory comprising stored associations between exemplary sensor data and pre-determined interaction units, the memory further comprising processor-executable instructions, which when executed by the processor cause the empathetic computing device to receive contextual information associated with the user interaction, classify the sensor data as a sequence of interaction units using the stored associations between exemplary sensor data and pre-determined interaction units, and provide feedback based at least in part on the sequence of interaction units and the contextual information.

BRIEF DESCRIPTION OF THE DRAWINGS

FIG. 4 is a table of pre-determined interaction units for use with an empathetic computing device in accordance with some examples of the present disclosure.

FIG. 5 is another table of pre-determined interaction units for use with an empathetic computing device in accordance with some examples of the present disclosure.

FIG. 13 is a table of sound pieces for use in generating audio feedback in accordance with some examples of the present disclosure.

FIG. 16 is a table showing exemplary results of a data analysis process in accordance with some examples of the present disclosure.

FIG. 17 is an illustration of recursive loops of example empathemes in accordance with some examples of the present disclosure.

DETAILED DESCRIPTION

Figure 1:
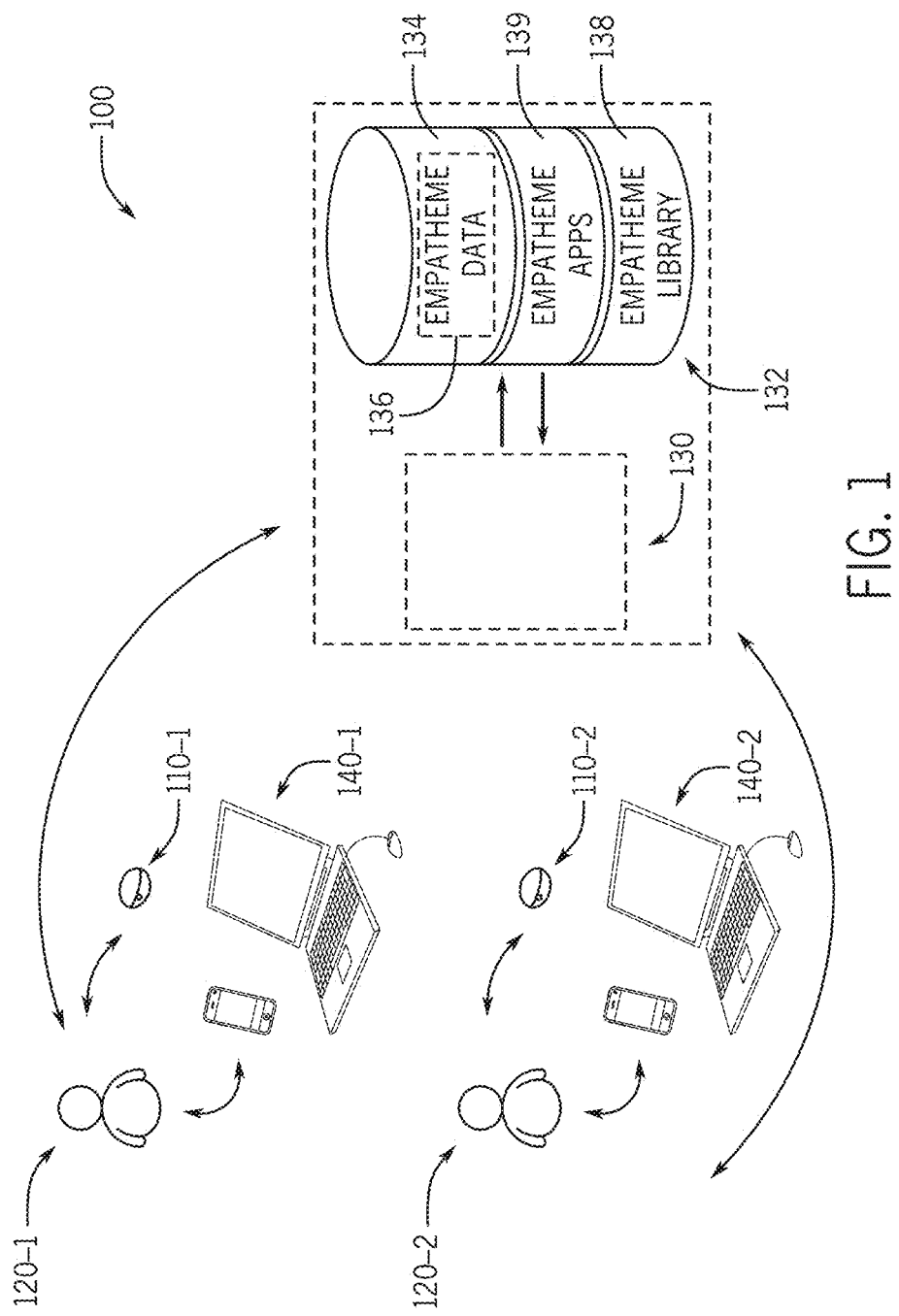
FIG. 1 is an operational environment for an empathetic computing system according to some examples of the present disclosure.

Examples of the present disclosure are directed to empathetic computing devices and empathetic computing systems. An empathetic computing device may be any computing device, including a portable electronic device such as a smart device, smart phone, etc., which is configured to execute an operating system utilizing an empathetic user interface. An empathetic computing system may be a computing system, which includes at least one empathetic computing device. An empathetic user interface may be a user interface which is operable to perform functions responsive to natural human actions (also referred to as natural human behavior), such as a user approaching the empathetic computing device, the user taking the empathetic computing device in hand, the user speaking or making a facial expression, a gestures a change in posture in proximity of the empathetic computing device, movement of the empathetic computing device by the user or relative movement of the user or the user's body part relative to the empathetic computing device, the user placing the empathetic computing device back onto the support surface (table, desk, counter, battery charger, etc.), and the like. These natural human actions are exemplary only, and the empathetic computing device may perform functions responsive to virtually any natural human action, further examples of which will be further described.

In some examples, systems and methods for empathic communication between user and a computing device are described. The terms empathic and empathetic may be interchangeably used herein. According to some examples, an empatheme language may be used to enable empathetic communication between user and computer. In some examples, the empatheme language and correspondingly the empathetic computing interface may be built around the natural interaction of a human with an object (e.g., the empathetic computing device) which may be designed to be touched or held in the user's hand. In some examples, the empathetic computing device may accordingly be a handheld device. In some examples, the empathetic computing device may be shaped and size to be comfortably held or grasped by the user and more particularly fit in a user's palm.

An empathetic computing device according to the present disclosure may be configured to acquire sensor data with one or more sensors onboard the empathetic computing device and classify the sensor data into a sequence of interaction units in accordance with stored associations between exemplary sensor data and pre-determined interaction units (e.g., empathemes). The interaction units may be extracted from user interaction such as natural human action including but not limited to verbal (e.g., speech and non-speech sounds and/or utterances) and non-verbal (e.g., facial, gestural, postural) expressions, and the like. The empathetic computing device may be operable to provide feedback of the sequence of interaction units that may be extracted from user interactions. Methods and systems according to the present disclosure may be useful, by way of example and not limitation, in applications directed to memorializing aspects of a person's life where conventional interaction may prove too cumbersome, distracting, and/or impersonal to be effective or desirable.

For example, it is widely known that trying to bring attention to one's own state of mind is an early step in raising self-awareness. A simple act of noticing, appreciating and/or learning from everyday activities may produce a positive effect that deepens a person's consciousness about his or her own behavior. Briefly, self-awareness may allow a user to focus on broader desires and goals. Maintaining a heightened self-awareness through constant effort in daily life nurtures mindfulness, which in turn provides more opportunities to realize something new and further improve self-awareness. However, a habit of mindfulness is not developed instantaneously, requiring both constant and continuous effort to reflect and review oneself. To facilitate such reflections on a daily basis, there are many proven approaches such as keeping a diary, performing self-reflection rituals, and implementing guided self-help practices.

While opportunities to achieve mindfulness abound in the minutiae of daily life, most are overlooked, unnoticed, and/or forgotten. It is simply impossible to make note of, or even be conscious of, every moment. Many efforts using personal computers, smartphones, and other computing devices have strived to capture these opportunities in daily life, thereby allowing a person track his/her activities, categorize his/her moods or emotions, or record moments for later review.

However, none of these efforts effectively overcome issues pertaining to the short attention spans of users and/or limitations of the computer/user interface. Often opportunities to achieve deeper realization are ignored or forgotten because interfacing with a device during device operation, including touching a screen on a smartphone, typing text on a keyboard, using a mouse, or navigating an interface, requires a user's attention and inevitably distracts the user. In particular, the opportunity to bring the user's attention to his/her own inner state of mind may only last for a brief moment, and is easily missed or ignored, even from relatively small distractions.

An additional problem with conventional methods has been maintaining user effort over time. The need for repetitive operation of a device to capture opportunities can diminish a user's motivation to pursue mindfulness as usage of the device for this purpose may feel increasingly cumbersome over time. Efforts to capture opportunities often do not last long and pursuing mindfulness becomes difficult to achieve without a better approach. Accordingly, embodiments of the present invention may enable the user to capture opportunities in daily life that may lead to improved self-awareness and mindfulness, while mitigating the effort required of a user to capture such events. In contrast to conventional approaches, a user may easily and consistently be aware of his or her state of mind by interfacing with an empathetic computing device through simple and easy interactions, such as those based on natural human behavior. Additionally, data gathered and generated through user interaction with an empathetic computing device or system may be useful within a context of "helping others." Such user interactions may generate information which may be useful not only to the user but to others (e.g., persons or entities that may be associated with the care of the user). For example, user interactions with an empathetic computing device may provide a means for obtaining, in a non-intrusive manner, information related to the well-being or habits/patterns of a user which may then be made accessible to caregivers (e.g., family, doctor, etc.). These use cases for data gathered and generated through user interaction with an empathetic computing device or system are exemplary only and many other uses of such data will be appreciated in view of the present disclosure.

Examples of the present disclosure are directed to systems and methods for empathic interface with a computing device (also referred to as empathetic communication between a user and a computing device). According to some examples, an empatheme language may be used to enable extraction, organization, and storing of interaction units (also referred to as empatheme beads of moments) from natural human behavior (including verbal (e.g., sounds or speech) and non-verbal (e.g., facial) expressions, gestures, posture, etc.) and providing feedback of the extracted interaction units.

The empatheme language described herein may be a building block for an empathetic computing system configured to execute an empathetic operating system (also referred to as empatheme OS), e.g., an operating system utilizing and empathetic user interface. As described herein, devices, systems, and methods for empathetic computing may utilize an empathic computing environment with a computer/user interface built around an empatheme language. Certain details of described examples as provided in the following description and drawings are set forth below to provide a sufficient understanding of embodiments of the invention. However, it will be clear to one skilled in the art that embodiments of the invention may be practiced without one or more of these particular details. For example, aspects of the present disclosure, as generally described herein and illustrated in the drawings, can be arranged, substituted, combined, separated, and designed in a wide variety of different configurations, all of which are implicitly contemplated herein. In some instances, well-known circuits, control signals, timing protocols, and software operations have not been shown in detail in order to avoid unnecessarily obscuring the invention.

Empathetic Computing System

FIG. 1 is a block diagram of an empathetic computing system 100 according to an embodiment. The empathetic computing system 100 may include one or more empathetic computing device 110-1 e.g., an empathetic computing device implemented in the form of an abot, which may be configured with an empathetic user interface. The empathetic computing devices may be configured for empathic communication (e.g., via an empatheme language) with a user 120-1. The empathetic computing device 110-1 may be implemented in accordance with any of the examples of empathetic computing devices described in U.S. Pat. No. 9,218,055, which is incorporated herein by reference in its entirety for any purpose.

In some examples, the empathetic computing device 110-1 (e.g., abot) may be communicatively coupled to a server 130. The server 130 may be communicatively coupled to a storage device 132, which may be incorporated into the server 130 or located remotely from the server 130. The storage device may store empatheme data 134, an empatheme library 138, and executable instructions for one or more empatheme applications 139. The empatheme data 134 may be stored in an empatheme database 136 and may store user data associated with user interaction with an empathetic computing device. The server 130 may be configured with an empatheme OS and/or may execute one or more empatheme applications 139, in which cases the server 130 may also be referred to as empatheme server 130. In some examples, the server 130 may use a conventional operating system and may be used for storage, further processing, and later access of data acquired with an empathetic computing device. It will be understood also, that in some examples the empathetic computing device 110-1 may operate without requiring access to or exchange of information with server 130. In other words, an empathetic computing device 110-1 in accordance with the examples herein may operate as a standalone empathetic computing system. In some examples, the empathetic computing device may be in communication with any number of locally or remotely located conventional computing devices such as laptops, handheld computing devices (e.g., smartphones), home entertainment devices, or other consumer electronic devices.

It will be appreciated that any number of empathetic computing devices and users may be associated with the empathetic computing system 100. In the illustrated example, two empathetic computing devices 110-1, 110-2 are illustrated, each associated with a user 120-1, 120-2; however in other examples, fewer or larger number of empathetic computing devices may be communicatively coupled to the server 130. While typically a given empathetic computing device may be associated with a single user (e.g., configured for empathetic communication with a particular user and generally not responsive to other users), in some examples the given empathetic computing device may be associated with and responsive to a plurality of users. The empathetic computing system 100 may work in conjunction with one or more conventional computing devices 140-1, 140-2 (e.g., including but not limited to a personal computing device such as laptops, smartphones, tablets, or the like).

Empathetic Computing Device

Figure 2:
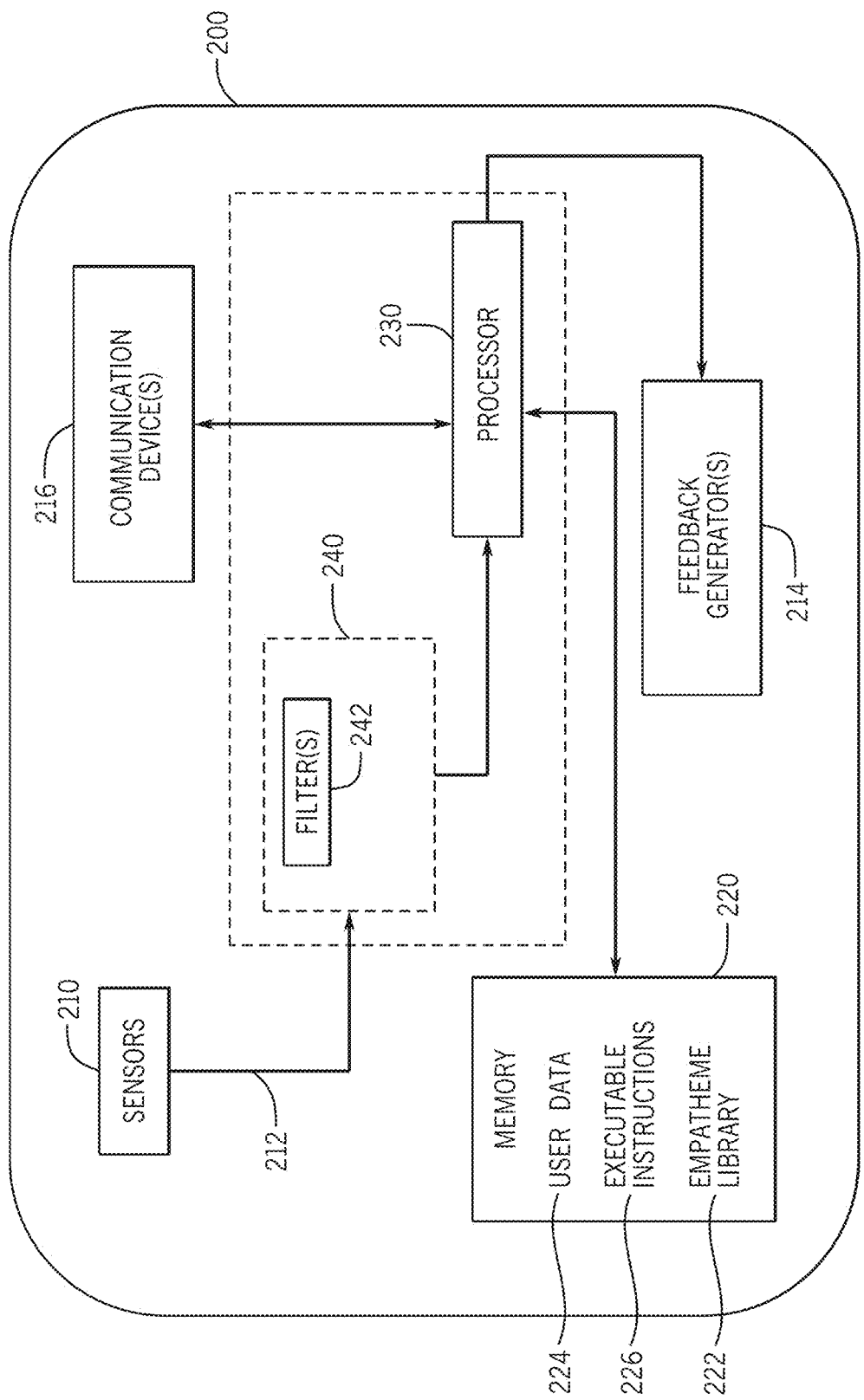
FIG. 2 is a block diagram of an empathetic computing device according to some examples of the present disclosure.
Figure 3:
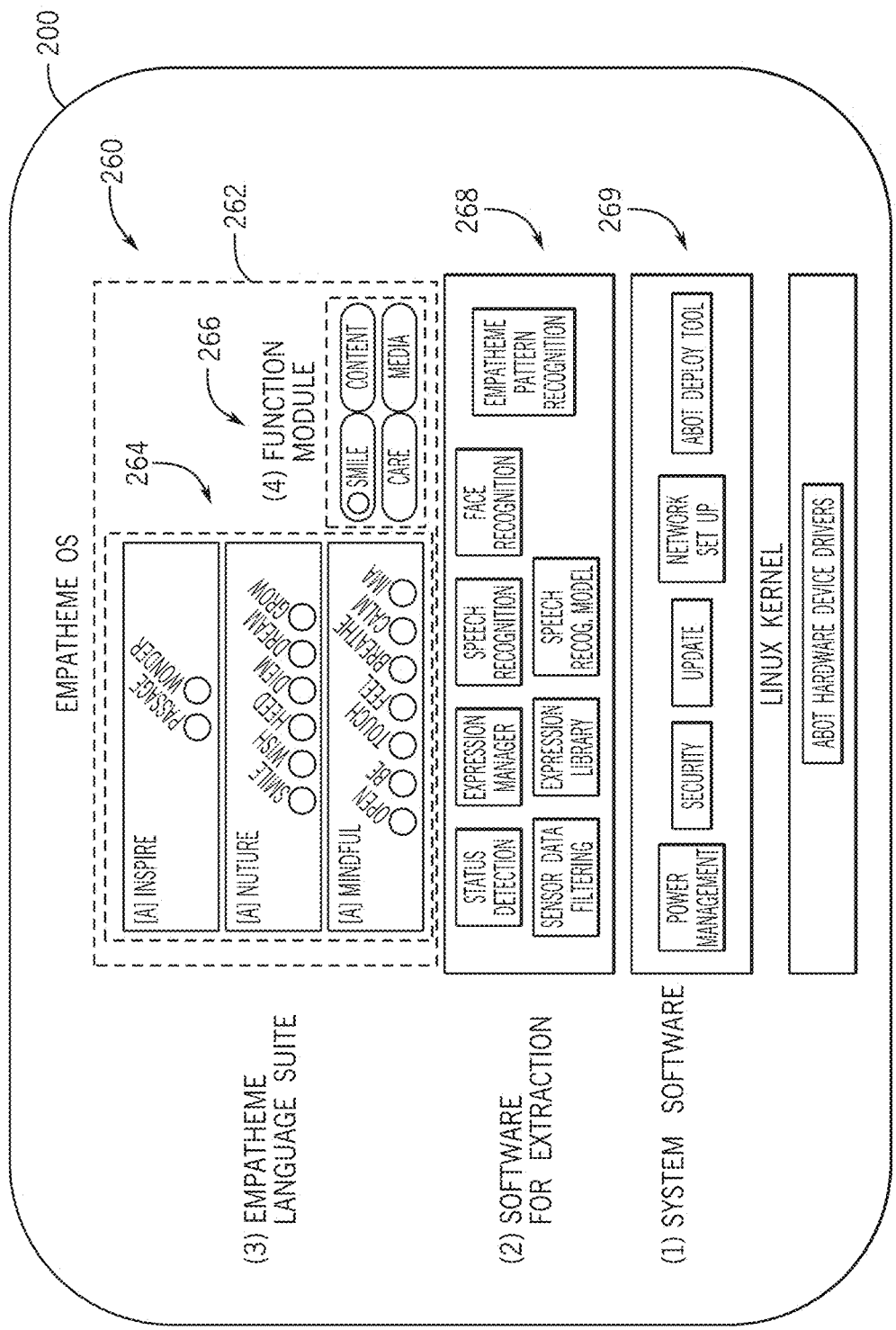
FIG. 3 is a block diagram of the empathetic computing device in FIG. 2 according to some examples of the present disclosure.

An empathetic computing device in accordance with some examples may be implemented in the form of an abot. FIGS. 2 and 3 are block diagrams of an empathetic computing device 200 (e.g., abot) according to some examples herein. The empathetic computing device 200 may be used to implement any of the empathetic computing devices herein including the empathetic computing devices 110-1, 110-2 in FIG. 1.

The block diagram in FIG. 2 illustrates certain hardware components and FIG. 3 illustrates functional blocks including an exemplary operating system of the empathetic computing device 200. The empathetic computing device 200 (e.g. abot) may include sensors 210, memory 220, and a processor 230. The memory 220 may include one or more volatile and one or more non-volatile storage devices. Non-volatile storage may be used for persistent storage of data (e.g., user data 224) and processor-executable instructions 226 for performing functions of the empathetic computing device 200. In some examples, the processor-executable instructions may include instructions for executing the empatheme OS 260 including functions associated with the empathetic user interface 262.

The architecture of the empatheme OS 260 may include a system software layer 269 that handles basic computing functions such as resource management, power management, network management, etc., a software layer that handles data processing (e.g., feature extraction and sensor data classification as related to empatheme communication), and one or more software layers associated with the empatheme language suite 264 and functional modules 266. The functional modules may perform functions such as external device connectivity, for example, connecting to other computing devices, home electronic devices such as TV set, media devices that can handle personal or media content through external internet services.

The empathetic computing device 200 (e.g., abot) may be configured to record sensor data 212 and process the sensor data to implement the empathetic user interface 262, for example to extract interaction units from user interaction with abot, organize the interaction units into a sequence of interaction units, detect and/or retrieve contextual information (also referred to as context) associated with the user interaction, generate feedback (e.g., audio, visual, and/or haptic feedback), and/or cause the information related to the user interaction to be stored in the form of computable data. To that end, the empathetic computing device 200 (e.g., abot) may include one or more sensors 210 including, but not limited to, proximity sensor(s), motion sensor(s) such as accelerometers, gyroscopes, compasses, inertial measurement units (IMUs), light sensor(s), pressure, temperature, and/or heat sensor(s), audio sensor (e.g. microphone), image sensor(s) (e.g., camera), and others. The empathetic computing device may be configured to wireless communication with other computing devices (e.g., personal computer 140-1, server 130 in FIG. 1). To that end, the empathetic computing device may include one or more communication devices 216 (e.g., Wi-Fi communication device, Bluetooth device and other near and far field communication devices; cellular communication devices such as 3G/4G data, etc). The sensors are operatively coupled to the memory and processor for recording user data, retrieving information (e.g., current date, time, etc.). The sensors may be coupled to one or more filters 242 (e.g., kalman filter, low-pass filter, band-pass filter, or others) for example for filtering out noise from the recorded sensor data. In some examples, the filters may be incorporated within a controller 240, which received the sensor date, pre-processes it before passing it to the processor 230 for empatheme extraction. In some examples, the processes of the controller 240 may be integrated within the processor 230.

The sensor data 212 may include voice data, image data, movement data, and the like. Voice data may be generated from speech/utterances of the user and may include linguistic and paralinguistic elements. Image data may include recorded images and/or video of the user's actions. Image data may capture facial expressions, body language or expressions, postures/gestures, and the like. Image recognition techniques (e.g., facial and/or object recognition) may be used to extract information from image data for use in the classification process described further below. Movement data may include natural actions, body movement of the user including relative movement of user with respect to abot. For example, user approaching abot, taking abot in hand, moving abot, shaking abot, grasping abot, placing abot back onto the table/desk surface may be captures using movement data generated by a variety of sensors including proximity, touch, motion sensors and the like.

The sensor data 212 may be in the form of multi-dimensional data obtained by simultaneously recording data (e.g., voice data, image data and movement data) from multiple sources (e.g., sensors) and/or supplementing the recorded data with additional information (e.g., contextual information). By capturing multi-dimensional data in this way, the empathetic computing device (e.g., abot) may be able to more effectively capture a greater number of nuances of natural human expressions (e.g., as extracted from image and motion data) and natural human language (e.g., as extracted from voice data) for use in the empathetic user interface. Additionally, by supplementing the record sensor data of the user's actions with context data, which may include data representative of the way a given user interaction was performed (e.g., closeness, clearness, calmness, continuity, constancy, etc.) as well as environmental parameters (e.g., date, time, ambient temperature, light, humidity), the user interaction may be further characterized to obtain yet additional nuances of the user's interaction with the empathetic computing device 200 (e.g., abot). Portions or all of the voice data and image data may be stored locally on the empathetic computing device (e.g., in memory 220) and/or in some cases remotely, e.g., on the server 130 or a conventional computing device, and later accessed for playback. Additionally movement data, context data or other data associated with a user interaction may also be stored on the empathetic computing device 200 as well as other computing devices including the server 130 or a conventional computer for future analysis, for example for pattern recognition.

Empathetic User Interface and Empatheme OS

The empathetic computing device 200 may be configured with an empathetic user interface 262 (also referred to as empathy interface), which unlike conventional computing system that rely on direct intentional user input (e.g., via a mouse, a keyboard), utilizes the empatheme language for communicating with the user. The empathetic user interface may be built around the empatheme language and may include input components, for example in the form of sensors 210, and output components, for example in the form of feedback generators 214. The empathetic user interface 262 may be configured to detect and translate natural human actions into commands for performing functions associated with the empathetic computing system as described herein. For example, the empathetic computing device 200 may be configured to interface with a user without the use of conventional tactile input devices (e.g., keyboard, mouse), or using fewer conventional input devices than may be common. In some examples, the empathetic user device may be configured to interface with a user using none or fewer conventional command-like inputs, but may instead extract the inputs from the natural actions of the user. Generally, the empathetic user interface 262 may rely not on explicit commands given by a user, but rather on natural actions of the user as detected and perceived by the empathetic computing device 200.

The empathetic computing device includes one or more feedback generators such as sound, light and vibration generators, which may enable the empathetic computing device to provide output in a one-dimensional (e.g., by generating output with a single or a single type of a feedback generator) or multi-dimensional way (e.g., by generating sequentially or simultaneously feedback using multiple or multiple types of feedback generators). In some examples, the empathetic computing device may be configured to provide output through whole bodily expression. The empathetic computing device (e.g., abot) may be perceived by the user an object or body in its own place with its own presence in the user's environment. The empathetic computing device (e.g., abot) may interface with the user (e.g., to provide) using its full body, for example by tilting, rotating, rocking, shaking, bouncing, or fully illuminating which full body actions may be perceived by a user as corresponding to an indication of nodding, turning away, laughing, shaking or trembling, jubilating, and others. In some examples, the empathetic computing device may include one or more vibration sources which are operably arranged to allow the empathetic device to move as a unitary object thereby providing output to the user.

In some examples, the empathetic computing device may provide output as a combination of bodily expression and light and sound expression akin to human communication in which a person may both move a body part or their whole body while also vocalizing and/or providing facial expression (e.g., winking). An empathetic computing device may similarly be configured, in accordance with the examples herein, to provide a bodily expression (e.g., in the form of physical movement of the object which may be abot) in combination with a light expression (e.g., an illumination of one or more lights which may represent a winking or a smile) and/or further in combination with sound expression which may represent vocalization. Of course these examples are illustrative only and other combinations of expression may be used, for example, the empathetic computing device may provide a "vocalization" feedback using light sources instead of sounds, as further described herein. As will be appreciated, an empathetic computing device (e.g, abot) in accordance with the examples herein may be implemented an object configured to react, respond and resonate with the user(s) by presenting itself with multi-dimensional expressions based on the multidimensional data captured from the user interaction through natural human actions.

In operation, the empathetic computing device 200 may acquire sensor data 212 and extract relevant information from the sensor data 212. The sensors 200 may be used to acquire sensor data indicative of a variety of human actions and environmental parameters such as touch, user proximity, sounds (vocal utterance by user, speech or non-speech, as well as ambient sounds and noise), temperature (e.g., user's body temperature detected through touch, ambient temperature), light (e.g., ambient light level), force (e.g., force applied by the user or due to impact or falling), touch (e.g., instantaneous contact with any portion of abot, or prolonged contact for example with a bottom portion of abot as when abot is placed in hand for example in the user's palm), facial expression (e.g., smile, frown, open mouth, blink, squint, or any other type of facial expression), eye tracking, movement toward or away from abot, movement of a user body part towards or away from abot, movement of abot, change of position of abot, change of orientation of abot, and many others. To that end, the empathetic computing device 200 may include a plurality of sensors including, but not limited to, proximity sensors (e.g., passive infrared sensors), accelerometers, compasses, gyroscopes, light sensors, touch sensors, heat sensors, pressure sensors, and barometers, an audio sensor (e.g., microphone) and an image sensor (e.g., a camera). The sensors 200 may be used to also obtain contextual information, such as ambient light, sound, or temperature. Additionally, contextual information may such as date, time, location, duration between consecutive interaction units, may be computed and/or retrieved, for example from other sources such as the server 130, using wireless communication devices 216 (e.g., wireless Ethernet devices, Bluetooth devices and the like).

The empathetic computing device 200 may be configured to extract interaction units and/or contextual information from the sensor data. The empathetic computing device may include extraction tools 268 for processing the sensor data so that it may be classified into a sequence of interaction units based on stored associations of exemplary sensor data and pre-determined interaction units. Individual ones of the stored associations of exemplary sensor data and pre-determined interaction units may also be referred to as empathemes (or empatheme beads), which form the foundation of the empatheme language and the sequence of interaction units may be referred to as empatheme sequence or string analogous to a sequence or string that comprises a sentence in natural spoken language. In a way, an empatheme may be thought of as a word in human language, an empatheme string may be thought of as a sentence in human language, and a sequence of or a set of empatheme strings may be thought of as a passage or paragraph, and so on. Thus, an empathetic user interface which is built upon the empathem language may be a closer analog to human language and humanize or empathetic communication that typical conventional user-machine interfaces. A library of associations between exemplary sensor data and pre-determined interaction units, which may also be referred to as empatheme library 222, may be stored, e.g., in memory 220 onboard the empathetic computing device 200. In some examples, the empatheme library may also be stored on the server 130 (e.g., empatheme library 138) which may facilitate updates to the empatheme language and empatheme OS.

Referring now also to FIG. 4, a table of exemplary empathemes 270 which may be used in some examples of the present disclosure is illustrated and described. For purposes of illustration, each empatheme may be identified by a unique identifier 272, for example in the form of a unique alphanumeric character or string of alphanumeric characters, a unique color bead, or other type of unique identifier. In the table in FIG. 4, 15 empathemes are illustrated; however it will be understood that the principles of the present invention may be implemented with a fewer or larger number of empathemes. For example, an empathetic user interface may be built around an empatheme language which includes 6, 7, 8, 9, 10 or more empathemes. In some examples, an empathetic user interface may be built around an empatheme language which includes more than 20 empathemes. In the table in FIG. 4, each of the 15 empathemes is identified by a unique string of alpha numeric characters as well as by a unique color bead. Referring now also to FIG. 5, the table 271 therein illustrates exemplary sensor data 276 which may be associated with a plurality of pre-determined interaction units 278 (e.g., empatheme beads). For example, an interaction unit (e.g., empatheme bead) designated as "open" may be associated with and therefore extracted from sensor data indicative of user proximity. The interaction unit (e.g., empatheme bead) designated as "be" may be associated with and therefore extracted from sensor data indicative of user remaining in proximity for at least a threshold period of time. A "touch" interaction unit may be extracted based on sensor data indicative of user contact with a bottom surface of the empathetic computing device, and so on. As previously noted, the specific designation of the interaction units, the number of the interaction units and exemplary sensor data associated therewith is provided for illustration purposes and other combinations of these may be operatively used in other examples. Information of the kind shown in tables 270, 271 may be included in an empatheme library (e.g., abot empatheme library 222 and/or server's empatheme library 138).

Classification of Sensor Data for Empatheme Extraction

Figure 6:
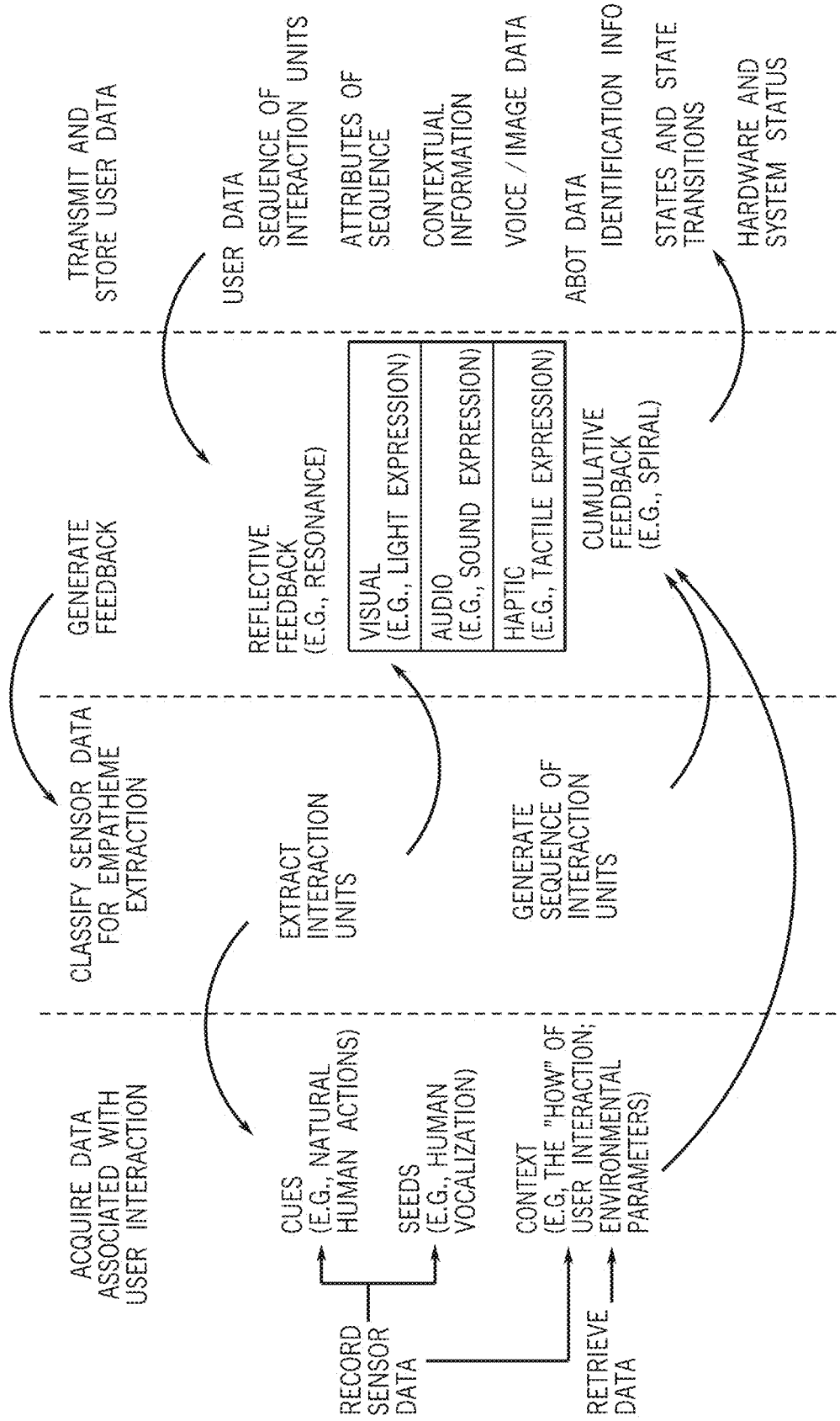
FIG. 6 is a process diagram for an empathetic computing device in accordance with some examples of the present disclosure.

An exemplary operational scenario will now be described with further reference to FIG. 6 to further illustrate aspects of the empathetic computing device and the empathetic user interface of the present disclosure. As described herein, an empathetic computing device may be configured to perform a process including acquiring sensor data with sensors of the empathetic computing device, classifying the sensor data into a sequence of the interaction units, e.g., by extracting a plurality of interaction units from the sensor data using stored associations between exemplary sensor data and pre-determined interaction units, and generating feedback representative of the interaction units. The feedback may include multi-dimensional feedback as described herein. For purposes of illustration, phases of the classification process are delineated in the drawing; however it will be understood that one or more of the processes described herein occur concurrently and/or in recursive loops in which multi-dimensional data may be recorded simultaneously and data from multiple sources may be simultaneously processed to extract relevant information.

In a first phase, data associated with a user interaction may be acquired, for example by recording sensor data and/or retrieving certain data from other sources (e.g., the server 130). Recorded sensor data may include cues (e.g., natural human actions) and seeds (e.g., human vocalization) as well as context (e.g., which may qualify and/or quantify aspects of the user interaction). The term cue (Q) may be used to refer to a user's natural human expression. A natural human expression may include natural human behaviors, including body position (e.g., in general and relative to abot), posture, hand and finger position, and voice utterance. Examples of cues may be the user's presence, state of being close, getting closer to abot, picking abot up by hand, touching abot with fingers, grabbing, holding, putting abot in the palm of user's hand, putting it down on the table, etc. Other examples of cues may include the user's facial expression, voice expressions, vocalized speeches, sounds, whether it's noise or not, or sounds by the bodily action and/or sound from the user's surrounding at the time of the bodily action. Generally, any natural gesture of the user may be considered a cue. For example, the action of approaching before touching may be an expression. Cues may be generated by multi-modal/multi-dimensional sensor data (e.g., sensor data from multiple sources recorded simultaneously, i.e. over the same period of time). The term seed (S) may be used to refer to sound piece that carries some meaning to the user(s), typically containing a chunk of words, which may be captured, processed, organized, and used in the processes described herein. A seed may include linguistic, paralinguistic, and nonlinguistic information of the sound; generally a seed may be any other human vocalization including but not limited to vocal gestures such as laugh, cough, sigh, clearing throat, sniff, puff, blow, etc.

Context may include information regarding how human behaviors are made, such as closeness (C1), clearness (C2), calmness (C3), continuity & constancy (C4), etc., as well as context information of the surrounding environment, such as brightness, noiselessness, time, day, month, year, season, temperature, duration, etc. The context of closeness may be measured in terms of quantity (duration) or quality of presence near the empathetic computing device. The context of clearness may be measured in terms of the quality of vocalization, ambient noise from the environment and/or human actions while vocalizing. The context of calmness may be measured in terms of stillness (e.g., lack of movement of abot and/or movement of user or user's hand, fingers, etc.) during user interaction. The context of continuity & constancy (C4) may relate to user interactions spanning a larger period of time (e.g., a day, a week, a month). The context C4 may be derived from a number of times the user interfaces with abot, the number of same or similar interactions (e.g., constancy in creating the same empatheme bead or empatheme string over time). Empatheme strings and attributes thereof can be analyzed to obtain contextual information pertaining to constancy, which can then be used in a weigh process in future user interactions to provide feedback to the user of the constancy of mutual interaction with abot. Natural human language may include human speech, including linguistic elements, paralinguistic elements, such as speech tempo, tone of voice, etc., and nonlinguistic elements surrounding the user as well as the historical context. An empatheme may include the responses also as real time data.

Recorded sensor data and contextual information may be transmitted to the processor of the empathetic computing device, which may perform various processes (e.g., feature extraction, speech and face recognition, weighing of context, etc.) to extract interaction units. The empathetic computing device may reference an empatheme library (e.g., empatheme library 222) with stored associations between exemplary sensor data and pre-determined interaction units (e.g., as shown in tables 270, 271). The empathetic computing device may generate feedback during the extraction and upon completion of an extraction, e.g., responsive to the generation of the sequence of interaction units. For example, the empathetic computing device may generate reflective feedback (also referred to as resonance) responsive to individual interaction units. In some examples, the empathetic computing device may generate cumulative feedback (e.g., in the form of a spiral of light, a sequence of audible tones, or the like). Cumulative feedback may be representative of the sequence of interaction units within a given user interaction session (also referred to as nurture session). As described, the empathetic computing device may be configured to generate one or more types of feedback, such as visual feedback (e.g., in the form of light expression), audio feedback (e.g., in the form of sound expression), and haptic feedback (e.g., in the form of tactile or vibrational expression). Feedback in the form of light expression may be generated for example by illuminating lights in a variety of patterns, such as a spiral, a star, a flower, a sun, concentric circles or any other regularly arranged array of lights or a random pattern of lights. In some examples, the light expression may be static (e.g., all lights may be illuminated substantially simultaneously) or it may be active or moving (e.g., lights may be illuminated in sequence such as to represent a moving spiral, or to represent rays of a sun expanding radially outward, or others).

At the completion of an interaction session, the empathetic computing device may store locally and/or transmit for storage remotely certain data. For example, the empathetic computing device may store and/or transmit user data, which may include the sequence of interaction units, attributes associated with the sequence including attributes of individual interaction units in the sequence, contextual information associated with the interaction units and/or the user interaction session, as well as any recorded voice and image data. The empathetic computing device may store and/or transmit system data, for example identification information, state and state transition data, hardware and system status, and others. It will be understood, that storage and/or transmittal of data, e.g., to the server 130, may occur in real time, e.g., during a particular user interaction session such that a user may be able to perceive system/hardware state changes as well as monitor the classification/extraction processes in real time, e.g., via the server 130. User data and system data associated with a particular user and/or empathetic computing device may collectively be referred to as empatheme data. The server 130 may include data storage devices for storing empatheme data associated with any number of users and any number of empathetic computing devices, as will be further described also with reference to FIG. 14.

The processing of data by the empathetic computing device may occur at milli- or micro-increments of time (e.g., every 5, 10, or 15 milliseconds) so as to approach a nearly seamless flow of interaction between the empathetic computing device and the user. As noted herein, the empathetic computing system may record and process sensor data by way of one or more recursive loops. A recursive loop may include a communication loop between the empathetic computing device and the user, between the empathetic computing device and the server, between the user and a conventional computing system (e.g., used to access stored data on the empathetic computing device and/or the server), between the user and the server, and so on. By classifying the sensor data and contextual information acquired by the empathetic computing device in this manner, the empathetic computing system may be operable to segment natural human behavior into interaction units and characterize, organize and store information associated with these interaction units in the form of meaningful computable data.

Figure 7A:
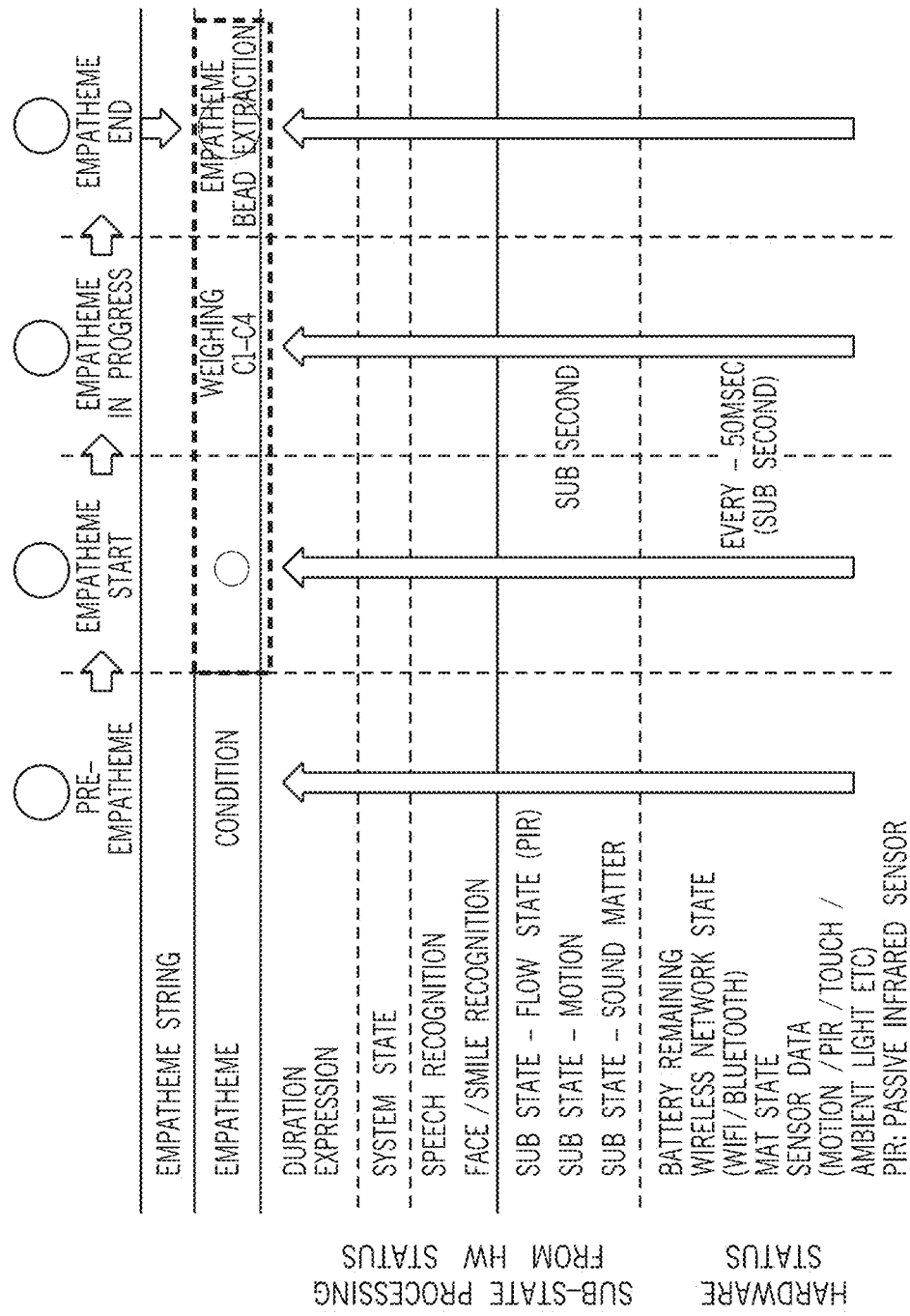
FIGS. 7A and 7B are process diagrams illustrating stages of empatheme extraction and state transitions of an empathetic computing device in accordance with some examples of the present disclosure.
Figure 7B:
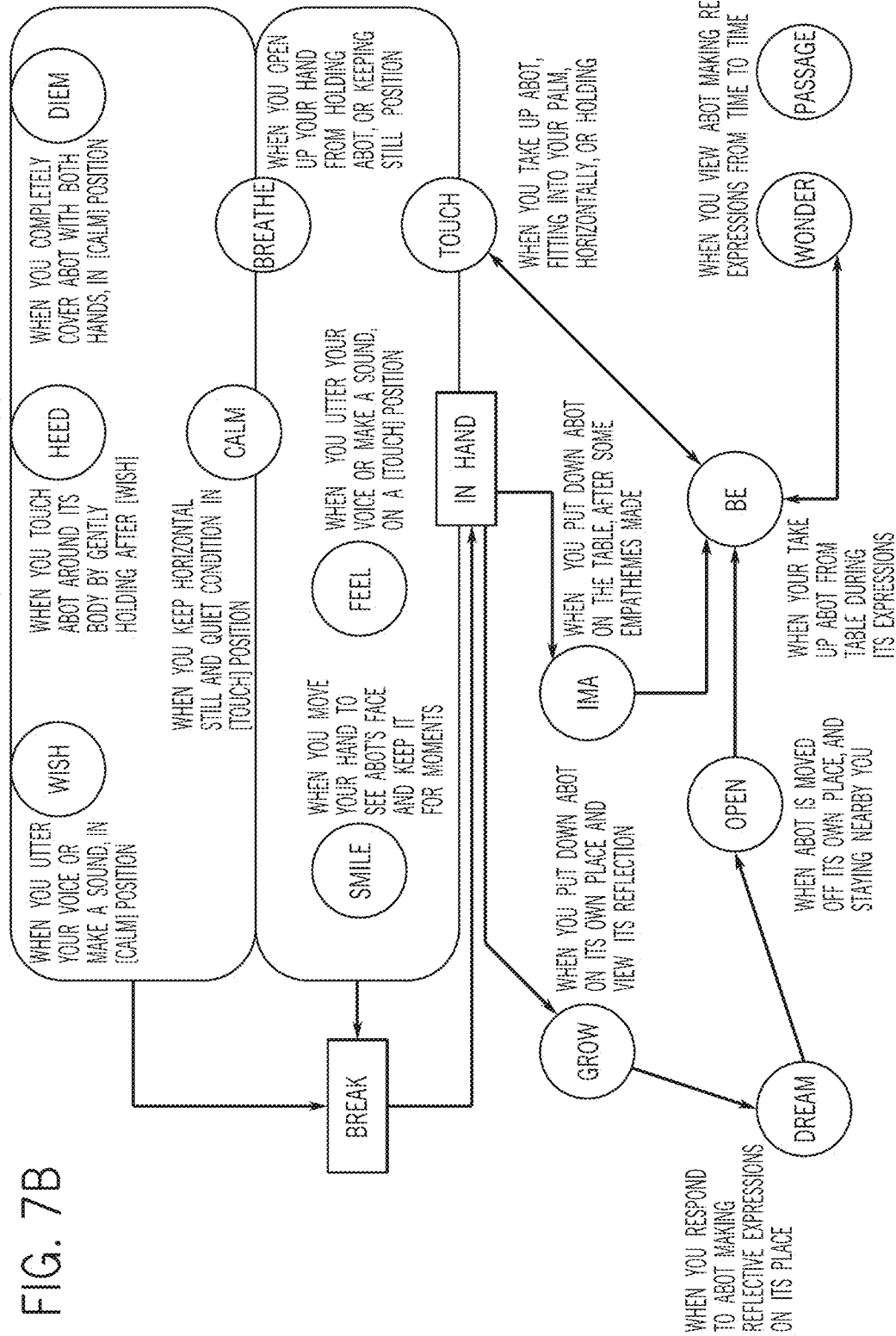

The classification of sensor data in accordance with stored associations (e.g., empathemes) may be performed in real time (e.g., as sensor data is being recorded) and may include feature extraction. Referring now also to FIG. 7, the classification of sensor data may, for illustration, be divided into four stages, for example pre-empatheme, start of empatheme, empatheme in progress, and end of empatheme. The classification may be performed in multiple layers using multi-dimensional data (e.g., data from multiple sensors and providing information across multiple variables). By analyzing data captured in parallel, such as voice/speech along with sub-state information as may be derived from motion data and/or contextual information (e.g., environmental information), the empathetic computing device may be operable to classify the sensor data into a wide variety of empathemes. One or more layers may include weighing of the recorded sensor data to generated weighted data.

As will be further described, the empathetic computing device and/or server 130 may store user data includes index data (e.g., indexing of the sequences, attributes and/or patterns derived from the formed), which may be used to improve the speed and efficiency of data retrieval and extraction of subsequent empathemes. For example, user data stored in the empatheme database may be indexed for ease of retrieval and/or comparison with other user data, for example user data that is being generated presently. Referencing and/or comparison to stored data may occur in real time to user data being presently generated to improve machine learning processes of the empathetic computing device. In some examples, the empathetic computing device may be configured to compare a current data set with a stored data set (historical data) to identify similarities such as similarities in sequences of interaction units as well as similarities in context and modify a response accordingly. For example, abot may determine that a sequence or subsequence of interaction units has occurred in the past and may vary a parameter of the feedback (increase a brightness of color of the LEDs during feedback generation) to signify a repetitive occurrence. Repeating or similar data sets may be linked and/or ranked appropriately, which may further facilitate faster retrieval and comparison in the future extraction and analysis.

In order for extraction to initiate, one or more conditions may need to be met during a pre-empatheme stage. If there is a disruption, such as a disruptive break or failure to meet a minimum time requirement in a certain state before extraction may begin, the extraction may be aborted. As an example, during a pre-empatheme stage for an "open" interaction unit, a necessary condition for extraction to begin may be user proximity for a predetermined period of time. If the empathetic computing device receives an indication (e.g., from a proximity sensor) of the user moving away from the empathetic computing device before a threshold period of time has passed, the extraction process may be aborted. Once a threshold condition has been met the process may proceed to the empatheme stage and weighing of sensor data may be performed e.g., in accordance with the contextual information associated with a given user interaction.

Before and during an extraction process, one or more sensors may be active, one or more sensors may be inactive and/or one or more sensors may be activated or deactivated responsive to transition of the empathetic computing device between states or modes. Activation and deactivation of certain hardware (e.g., sensors, light, sound, and/or vibration sources) and/or certain processes (e.g., face recognition, speech recognition, audio and video recording, etc.) may occur responsive to certain transitions between states. As an example, face recognition processes may be activated responsive to an indication of user facing the empathetic computing device (e.g., the user's face being directed towards abot's camera). Speech recognition may be activated responsive to detecting user's voice. Noise detection may be performed concurrently, e.g., during standby mode to remove noise artifacts and avoid unnecessary state transitions.

Figure 8:
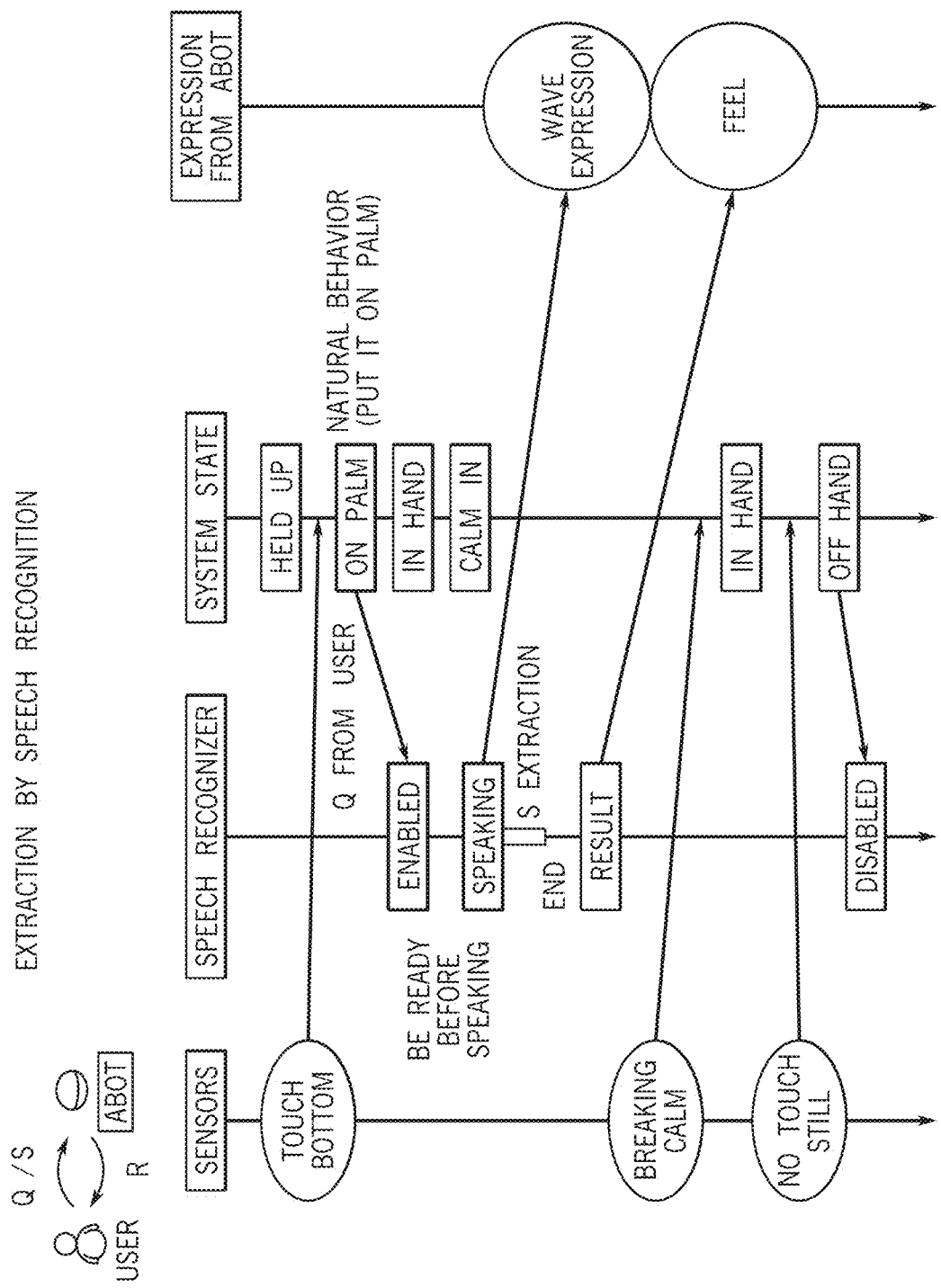
FIG. 8 is a process diagram for empatheme extraction by speech recognition in accordance with some examples of the present disclosure.

Certain interaction units may facilitate/trigger transition into another stage of the interaction process and/or another state or mode of the empathetic computing device (see also FIG. 8, which illustrates an example of process for speech extraction). For example, the interaction unit of "open" may trigger transition into the pre-interaction stage, the interaction unit of "touch" may trigger transition into the during interaction stage, the interaction unit of "ima" may trigger transition into a post interaction stage. During each stage, abot may be configured to perform certain functions including presence recognition, face and voice recognition, remote communication functions, feedback functions and others. During presence recognition, abot may be configured to detect interaction units associated with presence such as "be" interaction unit, "grow" interaction unit, "wonder" interaction unit and others. During a feel stage, abot may be configured to perform facial recognition, e.g., to detect "smile" interaction unit. During the feel stage, abot may also detect "breathe" and "feel" interaction units. During an inspire stage after "calm" interaction unit, abot may be configured to perform speech and motion recognition, e.g., to detect a "wish" interaction unit associated with speech or utterances of the user. During the inspire stage, abot may also be configured to detect "heed," "diem," and "ima," interaction units. Certain interaction units, such as "passage" may trigger certain functions, such as remote communication functions of abot. Certain interaction units may trigger retrieval of data associated with previous similar interaction units. For example, "dream" or "wonder" interaction units may trigger retrieval of previously recorded/stored data of previous "dream" or "wonder" interaction units. Previous data may be retrieved based on similarities with the present interaction unit. Certain interaction units may trigger machine learning processes, for example "wonder" and "dream."

An exemplary process of interfacing with an empathetic computing device is described. Initially, the empathetic computing device may be in standby mode, in which some of the components and/or processes of the empathetic computing device are inactive. In some examples, at least a proximity sensor of the empathetic computing device is active in standby mode. Upon detection of user proximity, the empathetic computing device may transition to wait mode. The detection of user proximity may occur responsive to receiving sensor data (e.g., from a proximity sensor) which is indicative of the user being in proximity or approaching the empathetic computing device. Responsively, an interaction unit, illustratively labeled as "open" may be extracted and reflective feedback corresponding to the "open" interaction unit may be generated, for example lighting a particular LED in a particular color.

Upon transition to wait mode one or more components or processes of the empathetic device may be activated while certain other components or processes may remain inactive. In some examples, at least one additional sensor, for example a motion sensor and/or a touch sensor, may be activated responsive to transitioning to ready mode. In some examples, motion and/or touch sensors may remain inactive until the empathetic computing device transitions into ready mode. The empathetic computing device may be configured to transition into ready mode responsive to receiving sensor data indicative of the user remaining in proximity for at least a threshold period of time. An interaction unit, illustratively labeled as "be" may be extracted and reflective feedback corresponding to the "be" interaction unit may be generated, which may differ from reflective feedback generated responsive to the previous or subsequent interaction units.

Upon detection of movement of the empathetic computing device and/or physical user contact with the empathetic computing device, e.g., as resulting from the user picking up the empathetic computing device and placing it in the user's palm, the empathetic computing device may transition into active mode. In active mode, some or most of the components and processes of the empathetic computing device may be active to enable the multi-modal/multi-dimensional analysis and extraction of data. The detection of movement of the empathetic computing device and/or physical user contact with the empathetic computing device may occur responsive to receiving sensor data indicative of change or position, orientation, acceleration of the empathetic computing device and/or contact with a bottom portion (e.g., a touch sensitive bottom surface) of the empathetic computing device. Responsively, an interaction unit, illustratively labeled as "touch" may be extracted and reflective feedback corresponding to the "touch" interaction unit may be generated, for example lighting a particular LED in a particular color, which may differ from the LED and/or color previously used for the "open" and "be" interaction units.

While in active mode, the empathetic computing device may be configured to record audio data and/or image data. The empathetic computing device may perform speech recognition and extract interaction units associated with sound or vocalization by the user (e.g., illustratively labeled "touch", "smile", "feel", "breathe" "wish," and/or "diem" interaction units). Notably, the empathetic computing device may be configured to detect paralinguistic elements (e.g., any vocal utterance such as a laugh, cough, sigh, clearing of throat, grunt, puff, whistle), which may provide additional contextual information to the user interaction. In a sense, the empathetic computing device may be operable to observe and listen to a wide variety of cues (vocal or non-vocal) to enhance the mutual interaction with the user. In some examples, the empathetic computing device may perform video processing (e.g., face recognition) to detect change in the user's facial expression or position relative to the empathetic computing device, for example to extract an illustratively labeled "smile" interaction unit. In some examples, interaction units associated with remaining still, holding the empathetic device in a still horizontal position, and closing and/or opening the user's hand(s) around the empathetic device may generate reflective feedback associated with other interaction units described herein.

In some examples, the empathetic computing device may be configured to pause or terminate extraction based on the occurrence or non-occurrence of certain conditions. For example, the empathetic computing device may pause recording of image or voice data upon detection of movement of the empathetic computing device in excess of threshold values. The empathetic computing device may be configured to extract an interaction unit illustratively labeled as "calm" responsive to sensor data indicative of holding the empathetic computing device in a still horizontal position for a threshold of time, following which extraction may be resumed. In further examples, certain user actions may trigger transition into reflective modes, in which the empathetic computing device may be operable to transmit user data generate cumulative feedback of a sequence of interaction units (e.g., illustratively labeled "ima" interaction unit) and/or provide feedback of multiple sequences such as all sequences generated during the day thus far (e.g., illustratively labeled "diem" interaction unit).

Figure 9:
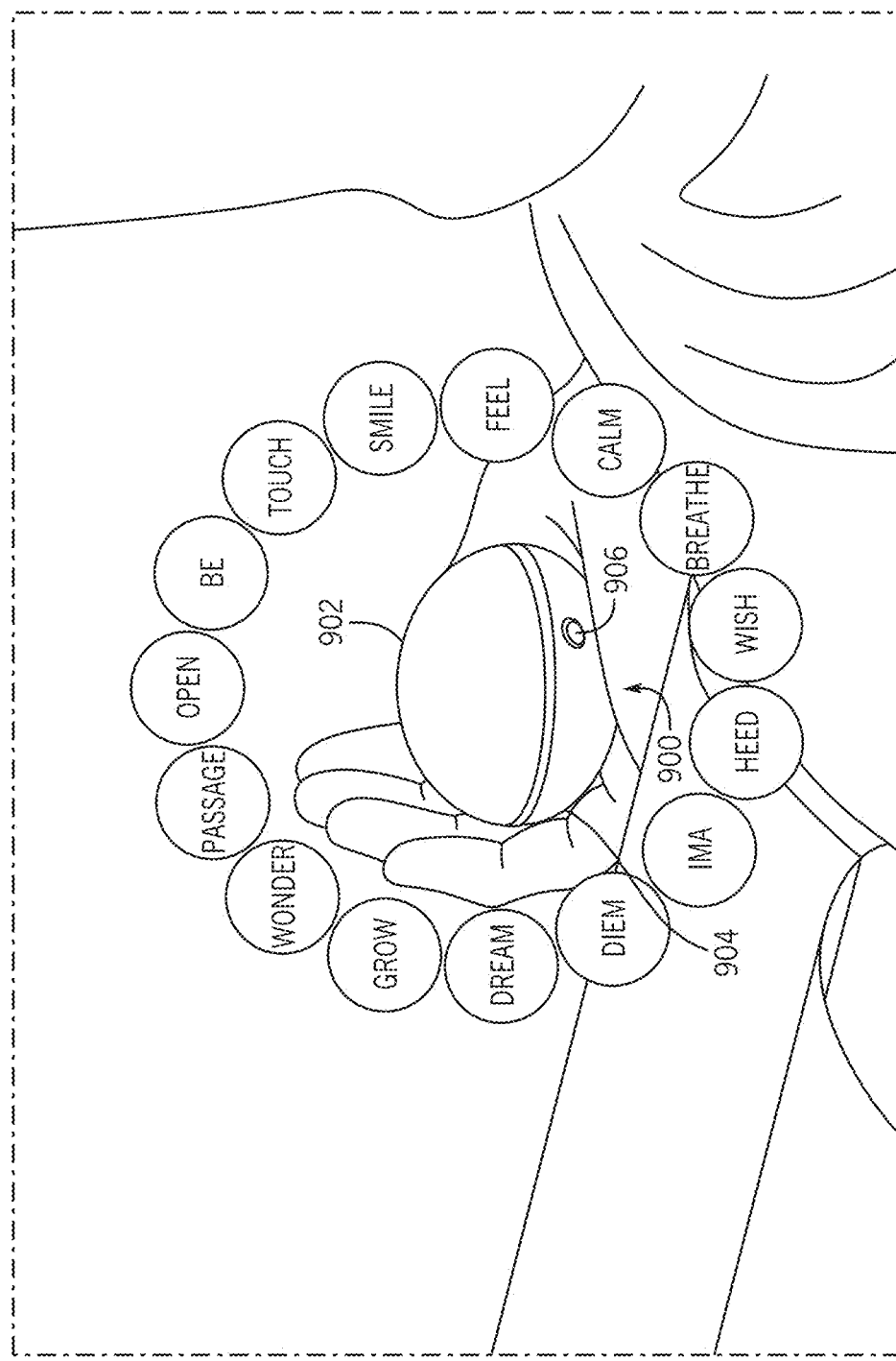
FIG. 9 is an illustration of an empathetic computing device according further examples of the present disclosure.
Figure 10:
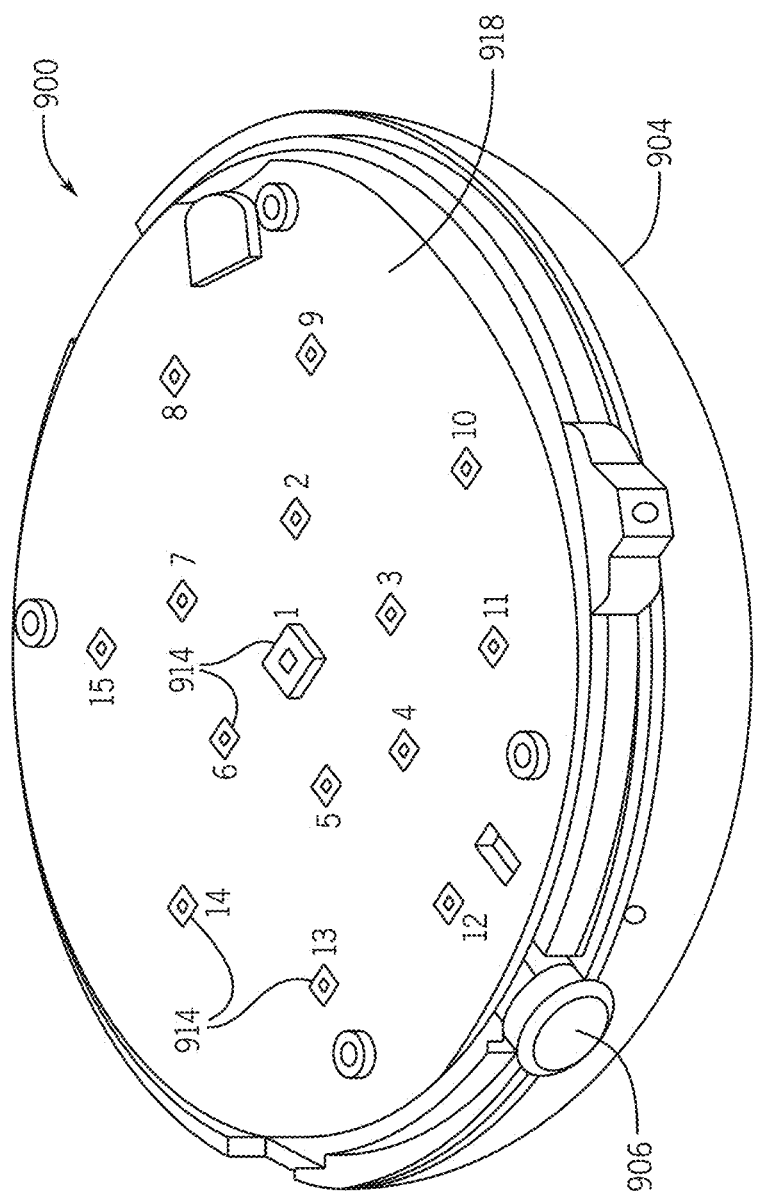
FIG. 10 is a bottom portion of the empathetic computing device in FIG. 9.
Figure 11:
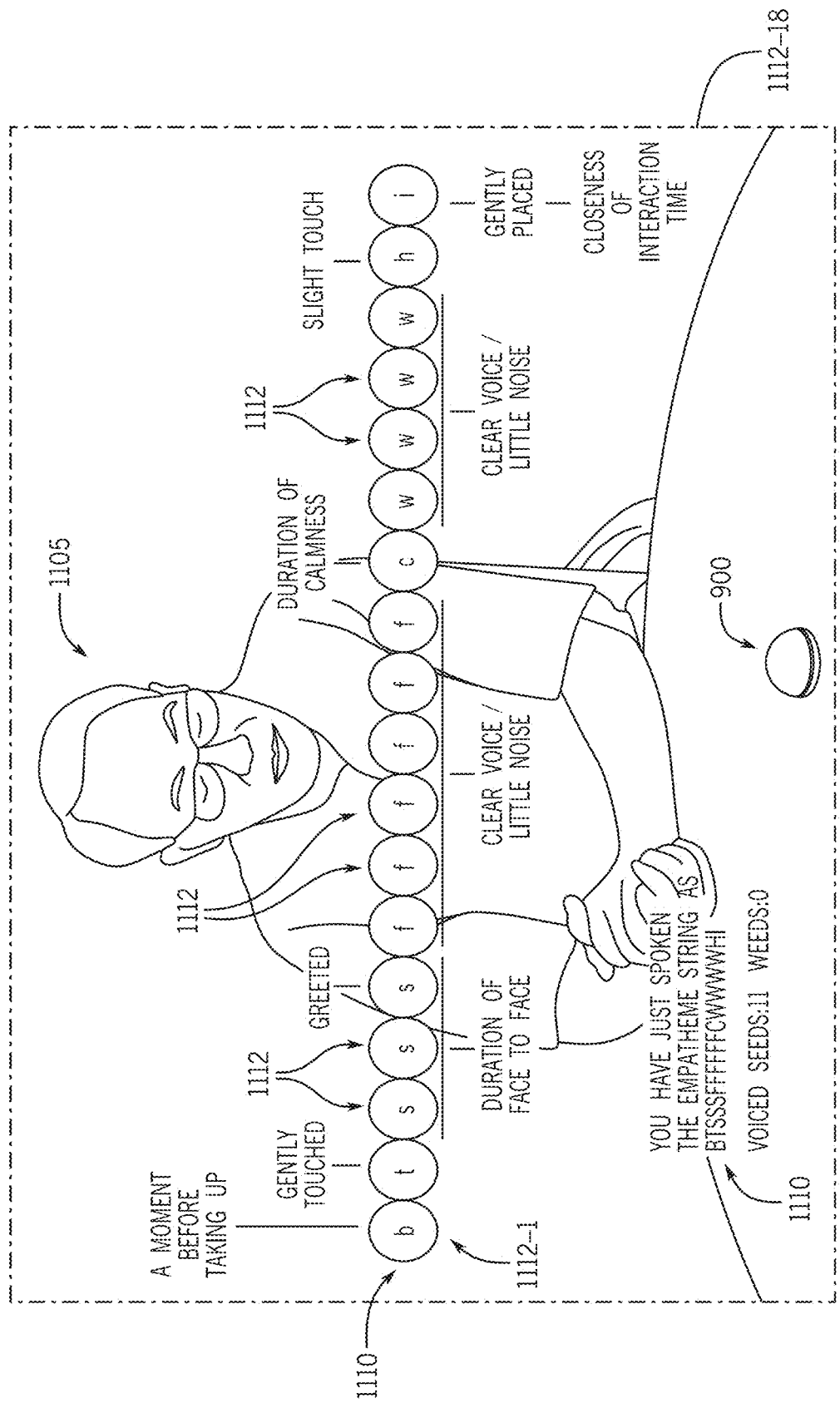
FIG. 11 is an illustration of a sequence of interaction units extracted during a user interaction session in accordance with some examples of the present disclosure.

Referring now also to FIGS. 9-11, additional features of empathetic computing devices in accordance with the examples herein are described. FIG. 9 shows an empathetic computing device in the form of an abot 900, and FIG. 10 illustrates a bottom portion of abot 900 showing certain internal components thereof. Abot 900 may include some or all of the features of empathetic computing devices described in the present disclosure as well as in U.S. Pat. No. 9,218,055, which is incorporated herein by reference in its entirety for any purpose. Abot 900 may be generally palm sized and have a rounded shape so as to comfortably fit within a user's hand (see FIG. 9). Abot 900 may have a rounded upper portion 902 which may be transparent or translucent, and a rounded bottom portion 904 which may be generally opaque. Abot 900 may include one or more sensors, for example touch sensors, proximity sensors, motion sensors, image sensors (e.g., camera 906), that may be enclosed within abot 900 or operatively arranged in communication with the ambience to record sensor data. Abot 900 may include a feedback generator in the form of a plurality of LEDs 914 (see FIG. 10). In the illustrated example, abot 900 includes 15 LEDs, numbered, for purposes of illustration, based on their location on circuit board 918. In some examples, abot may include any number of LEDs, for example 6, 7, 8, 9, 10, 11, 12, 13, 14, 15, 16 LEDs or more. In some examples, abot may include fewer than 6 LEDs. In some examples, abot may include more than 17 LEDs, such as 20 LEDs or more.

One or more LEDs may be illuminated simultaneously or in sequence to provide feedback to the user. A particular number LED or a color of an LED may be associated with a particular interaction unit. In some examples, generating reflective feedback may include illumination a LED with a color that corresponds to the color uniquely identifying that type of interaction unit. For example, when providing reflective feedback to the interaction unit "open," a yellow LED may be illuminated, when providing reflective feedback to the interaction unit "ima," a red LED may be illuminated, and so on. As described, the patterns of light created by illuminating one or more LEDs may be varied depending on the contextual information associated with any given interaction unit and/or user interaction session. For example, one or more parameters associated with individual ones or the plurality of LEDs may be varies, such as color, frequency, brightness and the like. Parameters may be varied at infinitesimal time increments, e.g., 40 milliseconds (25 Hz) or another suitable increment so as the change to be perceivable by the human eye. In this manner any number of variations of light patterns (light expression) may be created based on the particular sequence and contextual information. Parameters that can be varied may include color, color contrast, color intensity, brightness, frequency change, speed of change, and others. Any number of parameters that can vary the color, sequence and how the color and sequence are expressed may be varied.

FIG. 11 illustrates an example of a sequence of interaction units 1110 that may be generated based interaction between user 1105 and empathetic computing device (e.g., abot 900) during an interaction session in accordance with the present disclosure. Cumulative feedback in the form of a pattern of lights that correspond to the sequence of interaction units 1110 may be generated by abot 900 upon the completion of the interaction session between user and abot. In the illustrated example, the sequence of interaction units 1100 (also referred to as empatheme string) includes 18 interaction units 1112. The sequence 1100 starts with an interaction unit of the type "be" (e.g., interaction 1112-1) and ends with an interaction unit of the type "ima" (e.g., interaction unit 1112-18). As illustrated in this example, the empathetic computing device may detect vocalizations (e.g., vocalized seeds), generate reflective feedback following each extracted interaction unit and/or a cumulative feedback representative of the sequence. Although individual interaction units in the sequence are illustrated in a line, in some examples, the cumulative feedback may take the form of a spiral of lights generated by a plurality of light sources (e.g., LEDs) of the empathetic computing device 900.

As described, the feedback generated by the empathetic computing device may include reflective feedback corresponding with individual interaction units. As an example, abot may generate a first reflective feedback (e.g., illuminate the number 3 LED in the color pink) upon detection of a first predetermined interaction unit (e.g., a smile by the user), and abot may generate a second reflective feedback (e.g., illuminate the number 7 LED in the color purple upon detection of another predetermined interaction unit (e.g., enclosing abot by user's hands). In some examples, multiple lights or sounds may be used to provide reflective feedback for a given interaction unit. For example, in the case of speech detection, a plurality of LEDs may be illuminated to resonate a spoken word, as will be further described.

Figure 12:
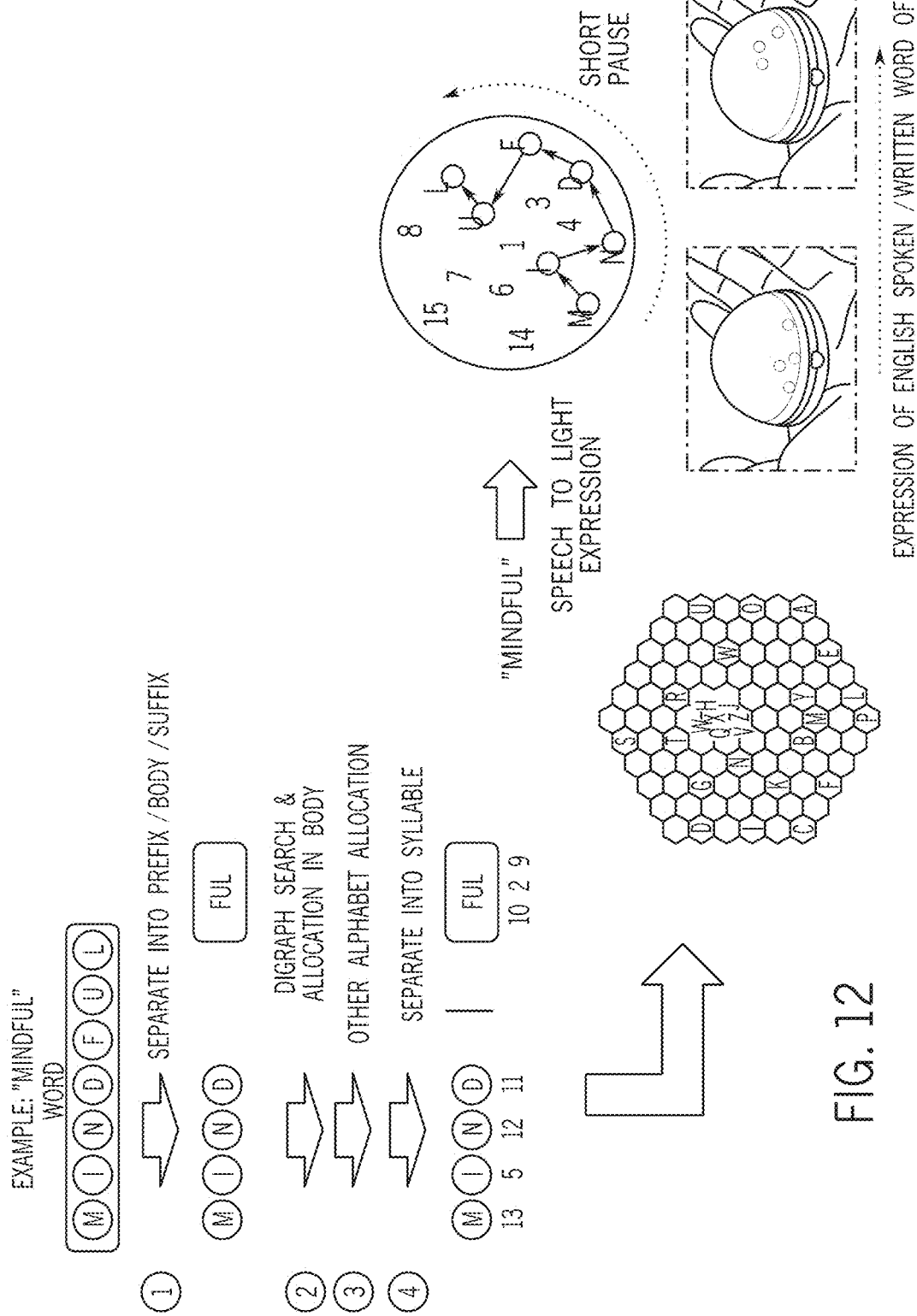
FIG. 12 is an illustration of an example of feedback generation responsive to user vocalization in accordance with the present disclosure.

Referring now also to FIG. 12, one example of generating feedback for a "seed" interaction unit, which may correspond with a detected spoken word, will be described. Each letter in the alphabet may be assigned a unique color. Any spoken word may be represented by illuminating a plurality of LEDs, with a given LED corresponding to a one or more prefixes of the word, and/or one or more suffixes of the word. The body of the word may be represented by the unique colors of LEDs that correspond with the letters in the body and the start of the body may be indicated by a predetermined LED, for example the #13 LED. In the illustrated example, an exemplary light expression for the word "mindful" is illustrated, but it will be understood that the specific example shown and described is provided only for illustration and any other combinations or variations of parameters of how the LEDs are illuminated or selected may be used for generating feedback in accordance with the present disclosure. For example, in other instances, instead of breaking down the body of the word into individual letters represented by uniquely colored LEDs, the word can be broken down into syllables and each syllable can be represented by a uniquely colored and/or uniquely positioned LED. In some examples, instead of assigning a single LED to a particular prefix or suffix, the prefixes and suffixes can also be broken down and expressed by individual LEDs and the duration of time that passes between the prefix, body, and suffix may be adjusted to indicate the transition between the different parts of the word. In a similar manner, phonetic sounds may be converted into light expressions, such that any vocal sounds pronounced, any phonetic sound articulated in any language can be allocated to light expressions by segmenting the sound pieces, without requirement that the vocalization is in a particular natural language. For example, the user may use English, or Spanish, or both when vocalizing and the empathetic computing device may be configured to extract interaction units based on these vocalizations regardless of the language spoken.

The reflective feedback (e.g., LED illumination pattern corresponding to the spoken word) may be generated immediately after the user interaction (e.g., immediately after the word is spoken) and the user may thus begin to learn to recognize the patterns that correspond to the spoken words or components thereof as a way of developing a mutual communication language with abot. In some examples, the duration of time between each illuminated LED and/or speed of change of individual colors that represent the word, as examples, may be adjusted to reflect the contextual information associated with this particular interaction unit. In some examples, contextual information may be incorporated only in the cumulative feedback generated after a completion of an interaction session, while reflective feedback remains unaltered to allow the user to continuously learn the mutual communication language with abot.

Figure 13:
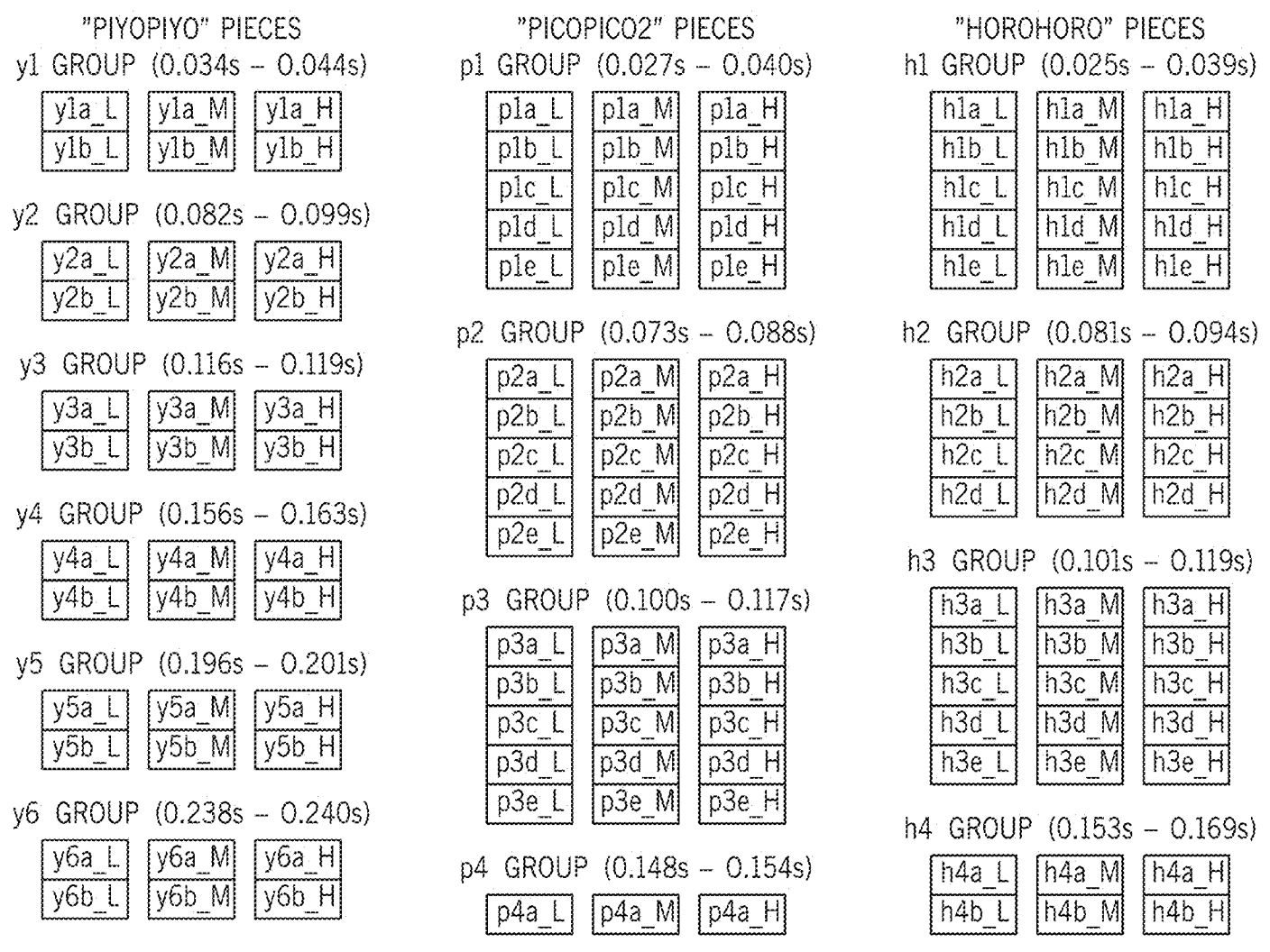

In some examples, the feedback may include visual feedback, audio feedback, haptic feedback, or combinations thereof. In the example of audio feedback, similar principals as described above may be incorporated to provide numerous variations for audible expressions. Small acoustic sound pieces may be used and parameters associated with these can be varied to capture the nuances of the expression which may be represented by the reflective feedback. FIG. 13 illustrates an example of sound pieces as may be used for audio feedback. In some examples, sound may be combined with light and haptic (e.g., vibrational) expression to provide the feedback in accordance with the examples herein.

The empathetic computing device may also provide cumulative feedback at the completion of an interaction session, which may be representative of the sequence of interaction units associated with a particular interaction session. In some examples, the cumulative feedback may take the form of a spiral. In some examples, a spiral may not be generated if certain conditions are not met. For example, at the completion of an interaction session (e.g., nurture session), the empathetic computing device may generate feedback including all of the elements of the reflective feedbacks generated during the interaction session. Any of the reflective feedback and/or the cumulative feedback may be adjusted in accordance with contextual information. For example, a frequency of the lights, duration between successive lights, color intensity and/or brightness or other parameters may be varied when generating feedback to account for differences in context.

In some examples, abot may be configured to generate cumulative feedback (e.g., in the form of a moving spiral) provided certain minimum conditions are met. For example, a moving spiral, or simply spiral, may be generated provided an interaction session includes at least a certain number of interaction units and/or a certain number of interaction units of a given type. For example, a spiral may be generated provided a sequence includes at least four interaction units and includes at least a "calm" interaction unit and/or a "breathe" interaction unit. This specific example is for illustration only, and other number and types of interaction units may be required as the minimum condition for a spiral. If the certain minimum condition is not met, a spiral may not be created and feedback may be generated in other ways; user data associated with the user interaction session (e.g., a dataset of the sequence, attributes of the sequence, context, etc.) may be stored locally (e.g., in abot's memory) and/or transmitted for remote storage regardless of whether a spiral is generated.

In some examples, the empathetic computing device may be configured to generate an inwardly moving spiral, which may include sequentially illuminating some or all of the LEDs in order from the outer most LED (e.g., #15 LED) towards the inner most LED (e.g. #1 LED), outwardly moving spiral, which may include sequentially illuminating some or all of the LEDs in reverse order to the inwardly moving spiral, a continuous spiral, which may include generating multiple spiral consecutively, or any combinations thereof. In further examples, feedback may be generated in the form of other illumination patterns not necessarily in the form of sequential spiral, e.g., illuminate #3 LED, then #8LED then #4, then #1 and so on. In this manner, a large number of light expressions may be provided by a variety of illumination patterns, which may be used to represent characteristics/aspects (e.g., structural organization of the mutual interaction) of any given interaction session.

As previously noted, the feedback provided by abot (e.g., reflective and/or cumulative feedback) may be generated taking into account contextual information. For example, two sequences of interaction units generated responsive to two temporally spaced interaction sessions may have the same number and combination of interaction units. The cumulative feedback of the two may however differ based on the contextual information associated with each interaction session. For example, contextual information associated with the first interaction session may include indicators of relatively higher "calmness" and "clarity," of relatively bright ambiance and/or warmer ambient temperature. The contextual information associated with the second interaction session may include indicators of relatively lower "calmness" and "clarity" and/or relatively dimmer and cooler ambient conditions. The feedback associated with the first interaction session may differ from the feedback associated with the second interaction session for example by generating feedback with different properties—e.g., a sequence (e.g., colors or pattern of light illumination) of lights that differ. For example increase closeness may be reflected by increased duration of time of the feedback; increased clearness may be reflected by increased brightness of the illuminated light; increased calmness may be reflected by duration of time between sequential lights. Contextual information (also referred to as "context") may provide weighing criteria during the classification and/or feedback generation processes. In other words, weighing is used to determine the relative quality between a given context as compared to a previous or multiple previous interactions of a similar kind for example for the purpose of adjusting the feedback that is generated.

Figure 14:
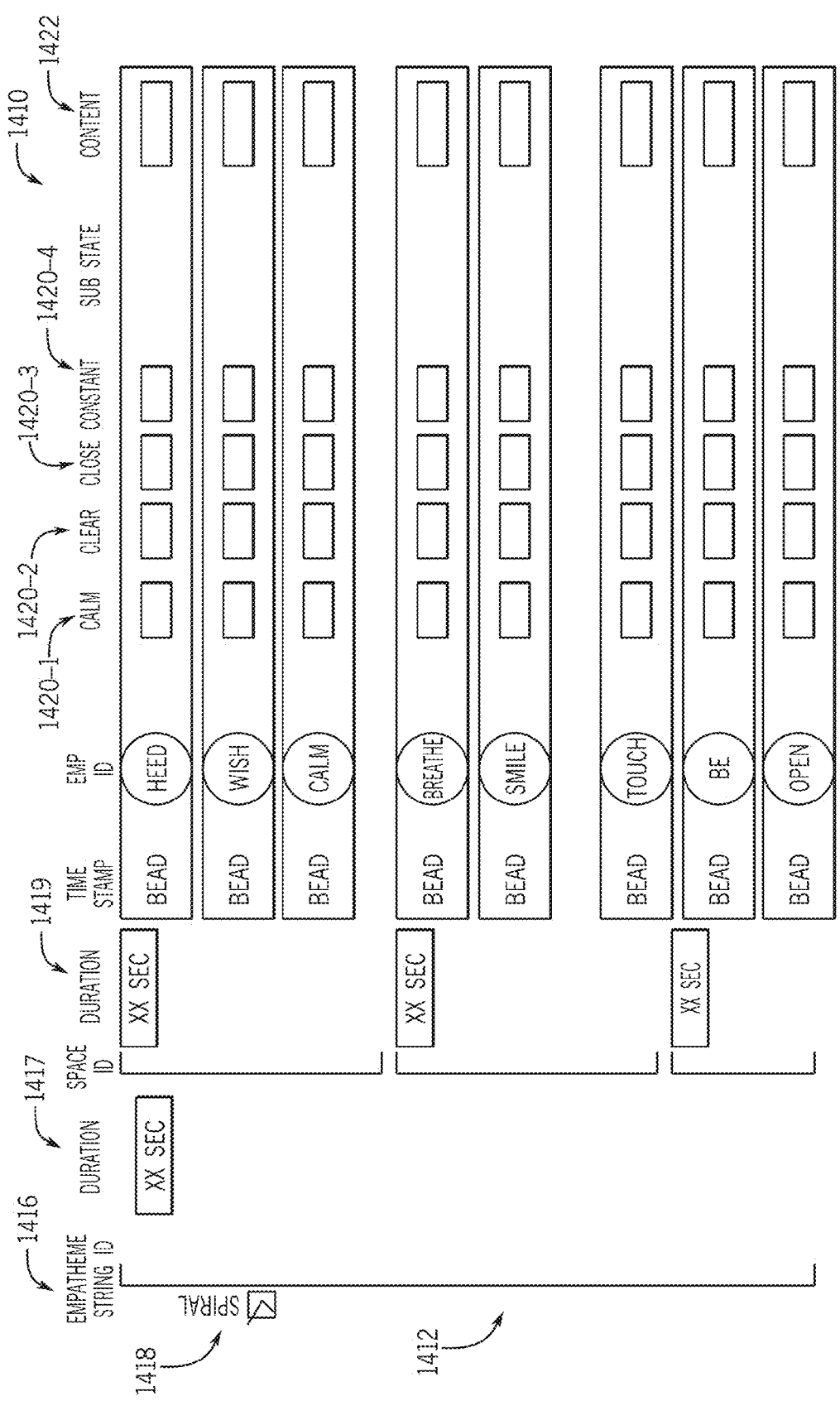
FIG. 14 is an exemplary data structure in an empatheme database in accordance with some examples of the present disclosure.

FIG. 14 shows an exemplary empatheme database 1410 which may be used to store empatheme data (e.g., user data, abot data, etc.). The empatheme database 1410 may be implemented in a storage device of server 130 or any storage device communicatively coupled to server 130. The database 1410 may include data structures which store empatheme data associated with one or more users and one or more empathetic computing devices. An empatheme record 1412 may be created for each user interaction session associated with a user in the database. The empatheme records may be created based on datasets transmitted from the empathetic computing device to the server 130. As previously described, the dataset may be transmitted upon the completion of an interaction session or may be transmitted piecemeal in real time during the interaction session.

Each empatheme record 1412 may include a unique identifier field 1416 that identifies the sequence of interaction units and may record the duration of the interaction session (e.g., duration field 1417) and individual durations of each interaction unit (e.g., duration fields 1419) as well as duration of the intervals between interaction units. Certain attributes, such as date, time, location, user id, abot id, may also be used for unique identifying sequences of interaction units in the database. Each interaction unit in a sequence may be uniquely identified in the empatheme record 1412 by a unique id and/or by a common descriptor specifying the type of interaction unit (e.g., by the unique identifier 272 of the corresponding empatheme bead). Additional attributes for the interaction session, including context associated with individual interaction units, may also be stored in each empatheme record, e.g., in context fields 1420-1, 1420-2, 1420-3, and 1420-4. Additionally, optionally, an expression field 1418 of the record may reflect whether or not a given sequence resulted in a spiral. The empatheme record may include a content locator field 1422, which may store a pointer to a location of stored content (e.g., voice and image data) associate with one or more interaction units in the empatheme record 1412.

As will be appreciated, each empatheme record individually may capture a small amount of information regarding a particular user interaction session, however empatheme data recorded over time (e.g., over days, weeks, months, years) may provide a large amount of computable data which may be analyzed to derive patterns. For example, a pattern may be extracted from a collection of datasets or a distribution of datasets. For example, a normal distribution (i.e. bell curve) can be obtained regarding a user's speech tempo, hand stillness, or other aspects of the user's communication during any number of user interaction sessions. As will be appreciated, there may be numerous uses such stochastic data, for example for identifying particular information regarding the user's state or condition at the time one or more empatheme strings are created. In some examples, such information may be the source for further expressions by abot when abot is off the user's hand, which may enable the user(s) to perceive notice many different kinds of things as reflection of his or her mind, as may be inspired by the expressions made by abot.

As more empatheme data is accumulated for a given user, this data may provide a database regarding the user's mindfulness, self-awareness, self-help practices, idea and thought creation, self-reflections, etc., along with vocalized speeches and natural bodily expressions and gestures recorded in the form of video, and may form a foundation for the user's unique personal information on day-to-day basis, to which other related information relevant to the user(s) can be attached. For example, other information such as weather, temperature, air pressure, phase of the moon, wind direction, pollen flying in the air, etc., which may affect human body physically, physiologically or psychologically, obtained through internet can be attached to the empatheme database. The user(s) may be able to further develop the empatheme database with external data that the user(s) may find relevant. The user(s) may find patterns, relevance, and/or connections, as a result of stochastic analysis of the empatheme data. In this manner, an empatheme database may form a basis for self-search, self-discovery, and self-exploration.

Empatheme Applications and Service Examples

Figure 15:
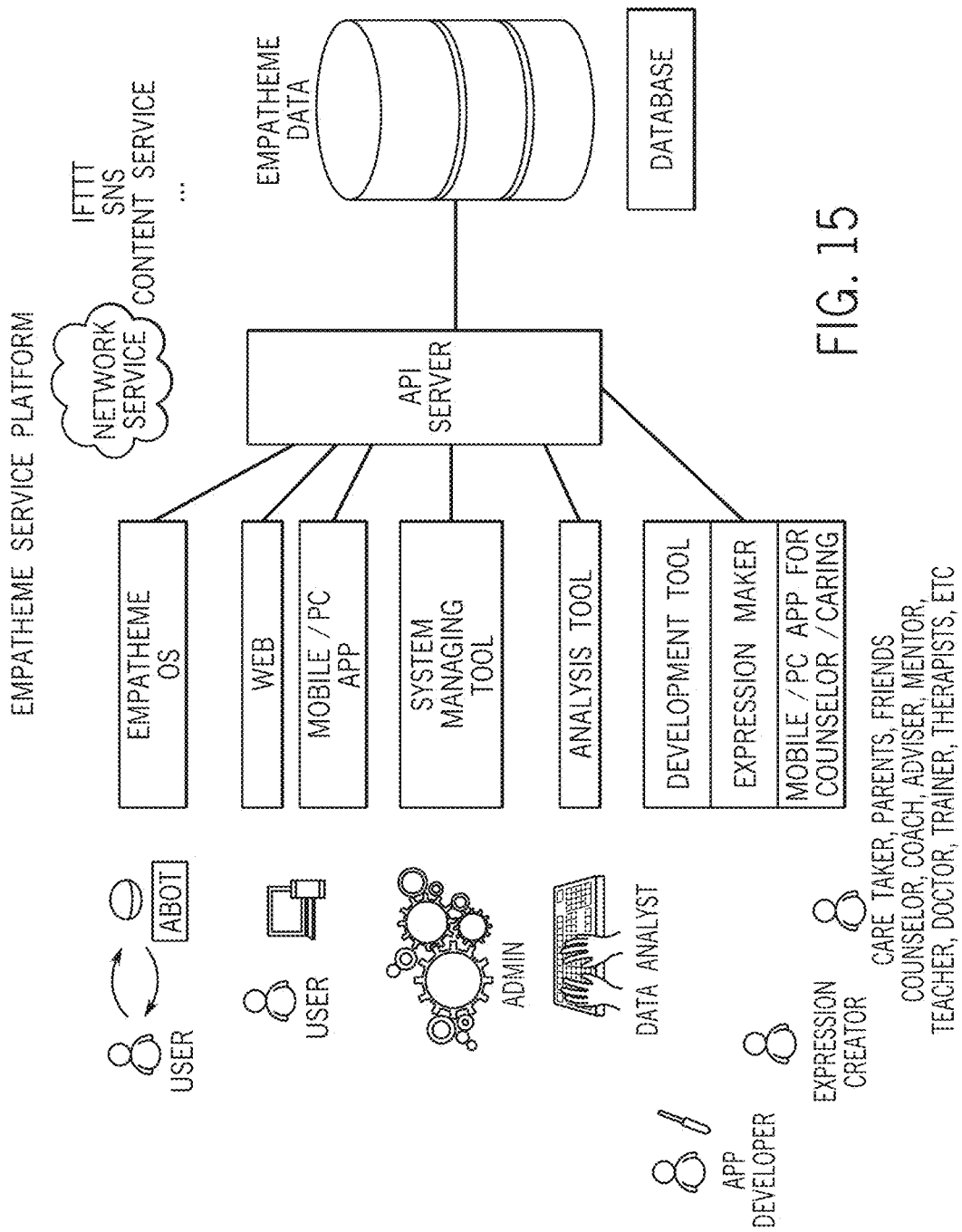
FIG. 15 is an illustration an empatheme service platform in accordance with some examples of the present disclosure.

FIG. 15 illustrates an overview of an empatheme service platform according to some examples. As illustrated in FIG. 15, there is a wide variety of ways to make use of the system as a service platform based on the combination of the empatheme OS and the database used through API servers (e.g., server 130) on the internet. For example, the communication between the user(s) and abot can be further enhanced, enriched or deepened through such services focused on providing useful information to the user(s) and or others associated with the user (e.g., care taker, parents, friends, doctors, etc.). External services for information can be used to complement the depth and width of information generated and accumulated from the user interactions/communication between the user(s) and abot. Interactive communication services for the purpose of providing the users with support in self-help, mentoring, counseling, health care, education, practicing, etc., can be enabled using the system and methods exemplified here. Also, new service providers, application developers may join on this platform.

Example 1—Hybrid Labeling System

The accuracy of speech recognition may not be always perfect or reach 100 percent due to the fact that the user may speak unknown words to the system such as proper nouns for certain names, or the user may speak to abot with considerable physical distance (i.e. far from the microphone), speak in noisy place, or speak in an unclear manner, etc. It is widely known that the speech recognition today, for example, on a smartphone device, works fairly well in some cases but in other cases, it may not match the expectation of the user. Some responses to spoken commands may be wrong, some commands or questions may be unanswered, some may be answered with a text expression "not available" or the like, and some may be interpreted as "not valid input". Such responses may disappoint, disturb, or offend the user's feeling regardless of the accuracy level of the speech recognition. Regardless of how well transcription from speech recognition is performed, ultimately the quality may be judged through the filter of the user's expectations. Thus advances to speech recognition and transcription technology may continue to be desired and the examples herein may improve on one or more of the shortcomings of existing speech recognition and transcription techniques.

To further illustrate some shortcomings in existing speech recognition and transcription techniques, there may be situations where latency or in some case no response results due to poor network connectivity (e.g., a user utilizing a mobile device which relies on a network such as the internet to provide a response). There may be situations in which the user may get a response from a server-based application such as assistant application, where the response (e.g., text) that may disappoint the users not only because of the accuracy but because of how it is provided (e.g., displayed or the volume or type of voice used to provide the response). Depending on how it is communicated, the user may feel bothered, annoyed, judged, obtruded, etc. Typical applications that perform a transcription from voiced speech may urge the users to speak again if the speech recognition is not successful, or connection to the internet or other network is not detected. These may result from the fact that the conventional methods are typically focused on generating a general answer (output) to the users, without taking into account or incorporating into the response contexts associated with the user or the interaction.

In a natural human communication, the user(s) may not always, or necessarily know or have decided exactly what he or she says before the interaction. Typically, it begins with recognizing each other's counterpart, mutually facing each other, accompanied by natural bodily actions or expressions, etc. Empathetic computing interfaces in accordance with the examples herein may be patterned after natural human communication by considering the experience of the users in communication with abot from multiple angles.

With this in mind, new methods of handling vocalized speeches may be implemented to maintain natural mutual communication between the user(s) and abot, as well as handling the speech information with careful attention in the system not to disappoint the user(s) when providing output to the user (e.g., generating expression with light, sound, and vibration). Also the speech transcription to written text may be more carefully handled not to give a response that may disappoint the user(s).

Communication with abot may be naturally created or facilitated with the presence of abot, making its own space in the daily living environment of the user(s). Any communication may start with a natural sequence between the user(s) and abot, using cues (C) and resonance (R) as described earlier.

The user may not have to have any particular speech expression in mind (i.e. input command in speech) at the beginning of the interaction. Rather, the user may be naturally and gradually invited to vocalize as abot provides expressions to the previous communicative interactions by the user. The user may not have to vocalize any particular speech and the communication with abot may continue according to the bodily expression of the users to abot. The user may simply need to be in the moment of natural communication with abot with his or her distance (for example, closeness), posture (for example, calmness), or location the user choose (for example, quite place) even without speaking. The user may speak whatever and whenever he or she may feel like vocalizing to allow abot to capture the vocalization without the user having to feel forced, obliged to "work for the device" to make the right input for the device.

Expressions generated by abot such as by using light, sound, and/or vibration may provide greater appeal to the sense or feeling of the user(s) than some conventional devices, and may enable the user to recognize or learn easily. Unlike conventional methods, abot may not directly display a text corresponding to the transcription or to a general answer prepared by an application using a server, nor seek to provide a "right" answer by interpreting the user's input and may thus facilitate a feeling of ease, freedom, and trust in the interaction with abot, which may further facilitate the development of habitual practices of the user by being able to continue the communications with abot without the distractions and difficulties that may be typical when interfacing via conventional methods.

Vocalized speech may be extracted and processed in small pieces of sound information, also referred to as Seed, which may typically correspond to a phrase or a sentence and may have a duration of sub 1 seconds to a few or more seconds. For example, a seed extracted from the vocalized speech of "good morning" may take 1.22 seconds, or 1.34 seconds in another case, as examples. A seed extracted from the vocalized speech of "I feel thankful" may take between 1.45-1.83 seconds, or in some cases shorter or longer time, depending on the user's speech tempo. The segmentation of vocalized speech, as well as any sound information (voice utterance other than vocalized speech, noise regarding the user's movement, or surrounding environment) into pieces of a few second may generally make it easy to process, for example, to perform tasks of storing, sorting, weighing, indexing associating, collating with the context information (C) in the empatheme data or the empatheme string information. The user's vocalized speech data made as a small piece of sound (e.g., Seed), connected and organized within the empatheme dataset may contribute to generating information that may be useful, interesting, memorable, intriguing, and/or explorable to the user(s). By virtue of acquiring multi-dimensional data including context, typically, the user(s) may be provided additional information regarding how the speech was vocalized, such as how calmly, how clearly, how gently, how long, how constant, and may be provided, in a non-intrusive manner with a feedback of weighing information regarding the speech. Nonlinguistic information, paralinguistic information, as well as linguistic information may be captured with the seed (S) and its associated context (C), and organized within the empatheme data.

FIG. 16 illustrates an example of sorting out a list of vocalized speech based on speech tempo using Time per syllable index figure. For example, a seed (S) with an expression of "I feel thankful" may be generated numerous times, and a list of all the seeds "I feel thankful" vocalized in different time may be generated. Time per syllable measures the net time duration of the vocalization extracted as Seed, which in the illustrated example typically ranges from 1.45 to 1.83 second divided by the number of syllables in the phrase (i.e. 6 syllables). Some Seeds may be labeled "prioritized" using the Time per syllable index data. Some Seeds may be labeled "very calm" using the Context (C) data that may address such characteristics by stochastic analysis. The accumulated data may be sorted to facilitate a ranking, prioritization, and/or filtering for a desired certain seed (S) or vocalized speech, which may then be checked for accuracy by another speech recognition performed on the server. Double-checking of filtered Seed(s) for accuracy of the transcription may be performed by a human person, or by a machine using the same or different speech recognition and transcription technique. A human transcriber may correct, fine-tune, modify, or rewrite a transcription if needed or desirable, or may add even more detailed information if desired, by listening to the recorded speech of the user(s). The piece-by-piece vocalized speech with various ways to label, index, mark, etc. may facilitate further handling of the information for the user(s). Generally, a transcription of unknown words or proper nouns is difficult since the system does not possess information regarding those that only the user(s) know. At the same time, a manual task of handling vast amount of vocalized speech, or a large undivided audio file which is not categorized or filtered in some manner may be difficult and efficient. Example of utilizing speech data which may be segmented into small pieces of audio data and categorized, tagged, or filtered in a selective manner may facilitate easier subsequent processing (e.g., reviewing and error-checking) of the audio data and may enable various opportunities to provide a useful service to the user(s) with a reasonable cost. In some examples, the extracted speech (e.g., Seed) may for example be weighed, sorted, filtered, tagged, indexed, and prioritized based on any part of the empatheme information associated with the Seed. For example, Seeds may tagged and/or filtered using contextual information such as to extract only Seeds that are associated with a particular Context, in one example "calm." Subsequent processing may be performed only on the Seeds that have been tagged or filtered using the particular Context, in this example Calm, while other Seeds are ignored for the purposed of this example. In this manner, the data set that may need further processing may be greatly reduced providing a more efficient and cost-effective way to process speech data. The particular information that is used for sorting, filtering, tagging, indexing, and/or prioritizing may be selectable or configurable by the user, another person or entity associated with the user, or an administrator.

Extracted and transcribed words from vocalized speech may be added to the corpus (i.e. the user's personal word dictionary) of abot, which may be continually updated over time, and may facilitate machine learning by abot (e.g., it may enable improvements of the speech recognition capability of abot). In this manner, abot may continuously learn by updating the information from the user(s), and may continuously develop its capability to generate expressions which may more accurately reflect the interactions with a particular user(s). For example, abot may be able to create a resonant expression for an unknown which is vocalized to abot for the first time by using information gathered from speech recognition on other words (e.g., by performing speech recognition for a word that abot may be detecting for a second or subsequent time). It may seem more natural for the user(s) that abot responds in such a way that abot learns every time that the user communicates with abot by vocalizing a speech, which may contribute to a right understanding or mindset of the user(s) regarding what he or she may expect abot's responses.

Speech data combined with the empatheme dataset containing the surrounding information regarding the speech, or the paralinguistic information of the speech may be effectively and efficiently utilized to provide a service that meets or may exceed the expectation of the user, while minimizing the cost by focusing on, or pin-pointing on creating useful information. Combined with the way of expressions (i.e. light, sound, and vibration that make meanings, effect that appeal to human) based on transcription data, abot may enhance or enrich the mutual communication with the user(s). In this manner, useful information to other connected applications such as mobile or web applications may be provided in accordance with the examples herein.

Example 2—Nourish on Web Browser and/or Mobile Application

As the empatheme string data accumulates, certain patterns may be found with regard to the empatheme dataset such as the combination, sequence, type of empatheme in the empatheme string, the Context (C) information regarding each empatheme string, the seed (S) information. For example, some patterns may be found regarding the ways that the user vocalizes, in what manner similar, different, etc. The pattern recognition may be performed automatically to categorize, classify, and analyze those data.

In some example, even for the verbally same speeches (i.e. exactly same content of words and sequence of same words), the empatheme combination in one string may be different from the empatheme combination in another string, partly due to the Context (C), such as voice clearness, hand movement or calmness, duration of the time and other information associated with the empatheme string, being different. Thus, the user(s) may be able to search speech information by empatheme string, or contexts (C), by word contained in the seed (S), as well as time and date, and many other different types of information that may be stored in the database (e.g., in the form of empatheme data or user data). Unlike conventional techniques, the examples herein may provide a variety of ways to classify, organize, analyze and reorganize speech data, in a singular, periodic, or continuous manner in the daily life of the user(s), delivering useful information that may not be able to be achieved using conventional methods.

Also, the user's search history, trend, accumulations as well as the way the user performed search, for example, how and how much time it is done, may create unique patterns specific to the user(s) over time. Such patterns may become new data added to the empatheme database. The user's volition, feeling, emotions, thoughts, and mind activities may not to be easy to be directly captured from the outside, but the time and space in which the user spends time with abot, and expresses them through natural actions including vocalized speeches, no matter with or without certain awareness, or particular intention in the communication with abot in the daily life of the user, may manifest or reveal useful information. In other words, the information regarding such inner mind activities of the user's self may be captured by the ways described herein, may be organized, analyzed, and/or continuously reorganized in such ways that the user(s) may find useful or interesting. The user(s) may be invited or supported to notice, search, explore, discover something that is relevant to the user(s) in the continuously developing database, which may be accessible through a variety of suitable devices and/or application (i.e. mobile application, web application, as well as abot's expressions).

In addition to the mutual communication between the user(s) and abot, mobile applications or web-based applications may be used to provide the user(s) with complementary, additional, or different type of information. The user may be the person who constantly communicates with abot, or may be other persons that support the user. For example, parents, care takers, counselors, mentors, coaches, close friends, home doctors, or other type of persons who the primary user expect him or her to help with.

The user(s) may feel reminded, inspired, getting aware of by the information given by the extended information displayed, or experienced through other forms than abot (i.e. applications and services) and may feel motivated to start interacting communication with abot more, when the user is again close to where abot is. The user's motivation to continue is constantly supported as well as use such resource made by empathemes and Seed built overtime by the user him or herself with abot.

Example 3—Recursive Loop with Nourish

FIG. 17 illustrates a loop between Nourish, Post-Nurture and Nourish. "Nourish" may be a name given to the user's activities using such applications to reflect on his or her previous or recent information created through the "nurture" (e.g., mutual communication generating empathemes with abot). The nourishing, or reflecting on the empatheme data that the users have generated with abot, complements the entire time flow of the daily living time of the user(s), enhancing a loop of communication with abot. Since the output from the nurture sessions (e.g., the empatheme data containing wide varieties of information regarding the user(s) as well as the real time communication experience with the expressions by abot, turns into an input to the database that gives rise to abot's output (e.g., resonant expressions that abot initiates), which becomes an input to the user's mind, awareness, feeling at the time, which may generate user's continuous actions back to abot (i.e. new output), as well as the alternative track (e.g., through mobile or PC applications) that gives the user(s) and an input (information, visualization, illustration, etc.), which may trigger, remind, or inspire the user(s) make next action back to abot, or back to the database through the applications). In other words, what the user nurtures is reflected in what the user post-nurtures in a communication triggered by abot or what the user nourishes in the applications designed for it.

A seamless communication loop based on the empatheme data that only the user created for him or herself is generated and supported to continue in a recursive manner. The recursion is based on the empatheme data creation and expression flow between the user and abot, which the user may be always aware of and keep learning. The user may add some writing, text memo, or any other graphical ways by using the applications, to the empatheme data on the "nourishing" application (e.g., mobile, or PC application to review and work on the empatheme data/resource) regarding what he or she feels, comes up with in mind, reflect, etc., at the time the user newly feels, comes up in mind, reflect, which creates a new recursive information to the original ones. In this way, the empatheme data flows in a recursion in the mind of the user(s), too.

In general, conventional reminder applications, to-do-note applications, calendar applications sometimes may not work or last for a long period of time due to the fact that they become cumbersome to the user, with small barriers constantly adding up or starts to bother or annoy the user's mind. Or in other cases, typically, the user gets used to the automatic, routine, information from a machine-like service and loses, whether he or she likes it or not, the motivation to keep doing.

Communicative interaction is needed to keep the motivation of the users high, by constantly maintaining a mutual communication that user find it fun, interesting, useful, or any other feature that gives reasonable stimulus to the mind of the user on a daily basis, without the user's having to hustle in anything, with feeling obliged, bothered, disappointed, judged by the service. The human nature or characteristics regarding how he or she feels and responds may represent a large portion of what the system and methods constantly need to support and manage.

Typically, the good habit making consists of many small components that the user succeeds to fulfill everyday. The mutual communication between the user(s) and abot, continuously followed by, complemented by, and refreshed or updated by the new mutual communication experiences, enhances a constant flow of lasting communication in the daily life cycle of the user(s), generating solid information regarding the user(s) that the user can enjoy and find useful to know him or herself better, from time to time. A habit making may be a product or by-product of this continuous process that supports "small things add up and organized, constantly reorganized" for the growing benefits for the user(s) over time.

Example 4—Know Yourself/Discover Yourself

The vocalized speech by a user may be considered to have certain pattern specific to the user. When enough data is accumulated to perform stochastic data analysis, the speaking pattern may be found. For example, the speech tempo of the user, measured by the speech duration time with the phonetical pronunciation (e.g., time divided the number of syllables for the speech) may be one example of detecting specific information useful to the user(s). In general, although the human speech varies from person to person in the way it is voiced or pronounced, the tempo or speed of a vocalized speech (described as seed (S)) has certain range of the data distribution.

When the user puts a specific focused attention on how fast or how slowly he or she speaks, the duration time recognized as a speech, whether it is relative short (fast) or relatively long (slow) for the user, fits within a certain range. Such speech data of the user, collected and organized over certain period time, may give some indication to the variation pattern that has been made by the user's vocalization. The user may be affected by his or her physical condition, mental or emotional status, or the surrounding environment at the time of the speech and naturally generates a distribution of his or her own data regarding the speech tempo or speed. Such data may not have anything to do with the fact that human speech varies due to physical body structure, but only have to do with the situation or the context in which the user utters the voice speech.

Figure 18:
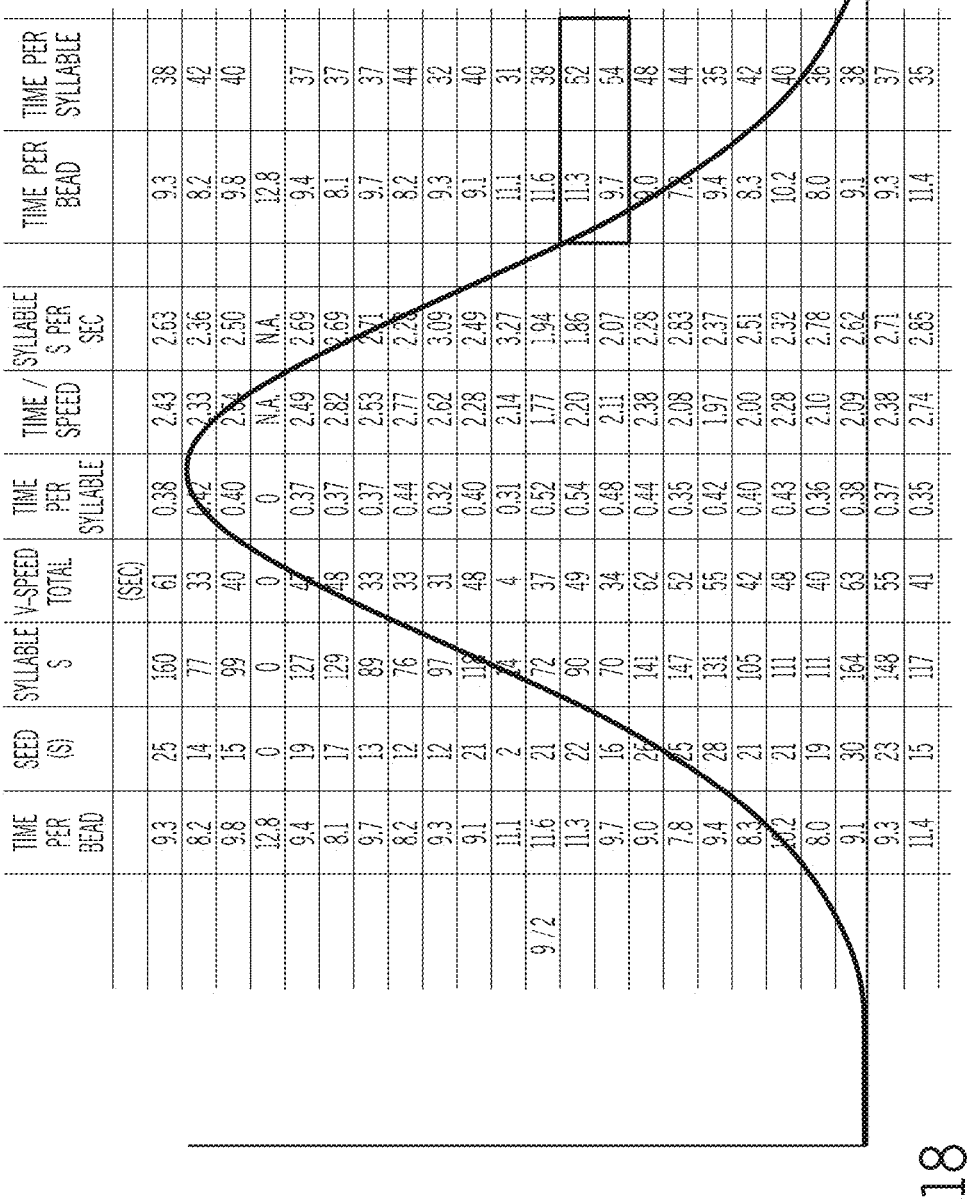
FIG. 18 is an illustration of stochastic analysis that may be performed on empatheme data in accordance with some examples of the present disclosure.

FIG. 18 illustrates a case of a user's speech tempo data, with a graph showing a so-called normal distribution, or typically called a bell curve, from the empatheme data containing the information for each vocalized speech the user has made. A certain distribution pattern (i.e. normal distribution) is found, where the Time per syllable index for the speech tempo of a seed (S) works as a parameter to classify the Seed information, as to if the user speaks slowly, fast, or in a normal way, compared to his or her own average or mean data. Abot may be able to resonate (e.g., reflect in its expressions during empatheme, etc.) with such variation of the user's vocalization.

This example of speech tempo may be used as a part of larger Context information, in combination with other Context data regarding the user's communication with abot. For example, "calmness" of behaviors through the nurture session or a set of nurture sessions (i.e. generating a set of empatheme strings) may be measured, using the empatheme database in the similar manner described above. Creation of parameters for finding, identifying, or searching, exploring a time and space (e.g., empatheme string) where the user's inner feeling or state of mind, conscious or sub-conscious behavior may be revealed or manifested from time to time, are useful for abot to continuously learn the user(s), recreate new resonant expressions, and generate feedback to the user that he or she themselves may be able to find something from. It may create and raise the chance for the user to know him/herself, to examine him/herself based on the neutral and natural information that the user him/herself created with abot. It may create an opportunity for the user to cultivate soul, as well as to use information to help others, as described in the service platform.

Example 5—Function Module(s)

An empathetic computing device (e.g., abot) according to the examples herein may be wirelessly connected (e.g., via WiFi or Bluetooth) to other electronic devices in the home or office such as TV, radio, personal computers, audio-visual displays, entertainment and media devices. For example, abot may create ambient expressions based on the empatheme data generated through previous mutual communications and project them on a TV screen, communicatively connected through function module(s) executing in abot's empatheme OS. Projection may occur responsive to an event, for example when the user approaches abot. In this manner, a living or working space may be enhance by the presence of abot that turns the space into an ambient that inspires the user(s) from time to time. The continuous communication flow or the recursive loop regarding the mutual communication and regarding the users themselves described herein may also be supported in this manner. The interactions with other electronic devices connected with abot may extend, complement, or enhance abot's presence in the mind of the user(s), contributing a natural environment in the daily life.

As another example, such interaction between abot and other devices may be used for the user(s) to enjoy personal content, media content displayed on the TV screen in more natural and intuitive manners than the conventional methods using remote commanders, making use of the interactive communication methods of abot. Not only that, the user(s) may annotate information to, or mark index to, such content, by using natural hand gestures or voice gestures in a simple way that the user(s) are used to with abot. Such function module to enhance the experience with abot may be added in accordance with the desires of the users. The empatheme database may form a basis for new type of unique personal information or personal resource regarding the user him/herself.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of interfacing with an empathetic computing system, the method comprising:
   receiving sensor data from sensors of an empathetic computing device, wherein the sensor data is generated by user interaction with the empathetic computing device, the user interaction comprising a plurality of interaction units;
   receiving contextual information associated with the user interaction;
   classifying the sensor data as a sequence of interaction units using stored associations between exemplary sensor data and pre-determined interaction units; and
   providing feedback with the empathetic computing device, wherein the feedback is based, at least in part, on the sequence of interaction units and the contextual information, and wherein the providing feedback comprises generating a pattern of lights with a plurality of illumination sources of the empathetic computing device, each light in the pattern corresponding to an interaction unit of the sequence of interaction units.

2. The method of claim 1, wherein the user interaction comprises natural human actions including any of a facial expression, a posture, vocal utterance, speech, body or body part movement or position, relative movement or position of the empathetic device with respect to the user.

3. The method of claim 1, wherein the receiving sensor data comprises receiving an indication of user proximity, user motion, detected speech, detected facial expression, or ambient condition.

4. The method of claim 1, further comprising storing a data set corresponding to the sequence of interaction units.

5. The method of claim 1, wherein the contextual information includes, at least in part, information extracted from the sensor data.

6. The method of claim 1, wherein the contextual information includes ambient light level, ambient sound level, ambient temperature, date, time, location of the empathetic computing device, or combinations thereof.

7. The method of claim 1, wherein a color of each light in the pattern is based on the kind of interaction unit.

8. The method of claim 7, wherein the color is further based on the contextual information associated with a respective interaction unit.

9. The method of claim 1, wherein the pattern of lights comprises a spiral of sequentially illuminated LEDs.

10. The method of claim 1, further comprising, generating, for at least one interaction unit in the sequence, feedback comprising a pattern of lights with a plurality of illumination sources of the empathetic computing device, wherein the pattern is indicative of content of vocalized speech extracted from the user interaction.

11. The method of claim 10, wherein the generating for at least one interaction unit in the sequence, feedback comprising a pattern of lights includes generating two distinct patterns of lights, each corresponding to a different word from the vocalized speech.

12. The method of claim 1, wherein the providing feedback comprises generating a pattern of audible sounds with an audio generator of the empathetic computing device, a vibrator of the empathetic computing device, or a combination of the two, one or more of the sounds in the pattern corresponding to an interaction unit from the sequence of the sequence of interaction units.

13. The method of claim 1, wherein the providing feedback further comprises generating a vibrational response.

14. The method of claim 1, wherein the user interaction is a first user interaction and wherein the sequence of interaction units is a first sequence, the method further comprising generating a second sequence based on sensor data associated with a second user interaction temporally spaced from the first user interaction by a pre-determined duration of time.

15. The method of claim 1, further comprising segmenting the sensor data into a plurality of sensor data sets each associated with respective one of a plurality of interaction sessions.

16. The method of claim 15, further comprising:
receiving an indication of an interaction free-period having a pre-determined duration; and
segmenting the sensor data into a first set of sensor data and a second set of sensor data, the first set of sensor data recorded during a first period of time and the second set of sensor data recorded during a second period temporally spaced form the first period by the interaction-free period.

17. The method of claim 16, further comprising comparing the first set of sensor data with the exemplary sensor data to identify a first interaction unit and comparing a second set of sensor data with the exemplary sensor data to identify a second interaction unit.

18. The method of claim 15, further comprising storing data sets corresponding to sequences of interaction units associated with the plurality of interaction sessions, and updating an interaction model of the empathetic computing device using the stored data sets.

19. The method of claim 18, further comprising transmitting the data sets to a server, and wherein the updating an interaction model of the empathetic computing device is performed by the server.

20. The method of claim 1, further comprising monitoring user interactions with the empathetic computing device during a period of time including determining a total number of interaction units in a given user interaction or during the period of time, a number of interaction units of a same kind in a given user interaction or during the period of time, a total number and types of sequences of user interactions, or combinations thereof, and characterizing a user pattern or user state based on the monitored interactions.

21. The method of claim 1, wherein receiving sensor data comprises receiving an indication of placement of the empathetic computing device in a palm of the user, the method further comprising activating a microphone, a camera, or both responsive to the indication of placement of the empathetic computing device in a palm of the user.

22. The method of claim 21, further comprising deactivating the microphone, the camera, or both responsive to an indication of removal of the empathetic computing device from the palm of the user.

23. An empathetic computing device comprising:
a processor;
a plurality of sensors configured to generate sensor data based on user interaction with the empathetic computing device, the user interaction comprising a plurality of interaction units;
a plurality of light sources; and
a memory operatively coupled to the plurality of sensors and the processor, the memory comprising stored associations between exemplary sensor data and pre-determined interaction units, the memory further comprising processor-executable instructions, which when executed by the processor cause the empathetic computing device to:
receive contextual information associated with the user interaction;
classify the sensor data as a sequence of interaction units using the stored associations between exemplary sensor data and pre-determined interaction units; and
provide feedback based at least in part on the sequence of interaction units and the contextual information, wherein the instructions to provide feedback based at least in part on the sequence of interaction units and the contextual information include instructions to illuminate one or more of the plurality of light sources in a pattern.

24. The empathetic computing device of claim 23, wherein the processor includes an extraction processor configured to receive the sensor data, filter the sensor data, and perform features extraction on the filtered sensor data.

25. The empathetic computing device of claim 23, wherein the feature extraction comprises extracting features from simultaneously recorded data from a plurality of sensors of different types.

26. The empathetic computing device of claim 23, wherein the feature extraction comprises performing speech and face recognition.

27. The empathetic computing device of claim 23, wherein the pattern corresponds to the sequence of interaction units, a color of each illuminated light source selected based on respective ones of the interaction units in the sequence.

28. The empathetic computing device of claim 23, wherein the processor, the memory, one or more sensors of the plurality of sensors, and one or more sensors of the plurality of light sources are enclosed in an enclosure configured to fit in a palm of a user.

29. The empathetic computing device of claim 23, wherein the plurality of sensors includes a touch sensor, a proximity sensor, an image sensor, a microphone, or combinations thereof.

30. The empathetic computing device of claim 29, wherein the touch sensor includes a touch sensitive surface disposed on a bottom side of the empathetic computing device.

31. The empathetic computing device of claim 23, wherein the plurality of sensors further comprises a plurality of infrared sensors configured to determine proximity of the user to the empathetic computing device.

32. The empathetic computing device of claim 23, wherein the plurality of sensors further comprises at least one light sensor arranged to sense ambient light.

33. An empathetic computing system comprising the empathetic computing device of claim 23, the system further comprising an other computing device communicatively coupled to the empathetic computing device, the other computing device configured to receive from the empathetic computing device and store data including user data, empathetic computing device system data, or combinations thereof, the other computing device further configured to execute an application for visualizing the stored data.

34. The method of claim 1, wherein the plurality of user interaction units correspond with sequentially performed user interactions.

35. The empathetic computing device of claim 23, wherein the plurality of user interaction units correspond with sequentially performed user interactions.

36. The method of claim 1, wherein the generating a pattern of lights comprises sequentially illuminating one or more of the plurality of illumination sources.

37. The method of claim 1, wherein each light in the patters comprises a light expression generated by illuminating one or more of the plurality of illumination sources.

38. An empathetic computing device comprising:
a processor;
a plurality of sensors configured to generate sensor data based on user interaction with the empathetic computing device, the user interaction comprising a plurality of interaction units; and
a memory operatively coupled to the plurality of sensors and the processor, the memory comprising stored associations between exemplary sensor data and pre-determined interaction units, the memory further comprising processor-executable instructions, which when executed by the processor cause the empathetic computing device to:
receive contextual information associated with the user interaction;
classify the sensor data as a sequence of interaction units using the stored associations between exemplary sensor data and pre-determined interaction units; and
provide feedback based at least in part on the sequence of interaction units and the contextual information, wherein the plurality of user interaction units correspond with sequentially performed user interactions.

39. The empathetic computing device of claim 38, wherein the processor includes an extraction processor configured to receive the sensor data, filter the sensor data, and perform features extraction on the filtered sensor data.

40. The empathetic computing device of claim 39, wherein the feature extraction comprises extracting features from simultaneously recorded data from a plurality of sensors of different types.

41. The empathetic computing device of claim 38, wherein the feature extraction comprises performing speech and face recognition.

42. The empathetic computing device of claim 38, further comprising a plurality of light sources, and wherein the instructions to provide feedback based at least in part on the sequence of interaction units and the contextual information include instructions to illuminate one or more of the plurality of light sources in a pattern.

43. The empathetic computing device of claim 42, wherein the pattern corresponds to the sequence of interaction units, a color of each illuminated light source selected based on respective ones of the interaction units in the sequence.

44. The empathetic computing device of claim 38, wherein the processor, the memory, one or more sensors of the plurality of sensors, and one or more sensors of the plurality of light sources are enclosed in an enclosure configured to fit in a palm of a user.

45. The empathetic computing device of claim 38, wherein the plurality of sensors includes a touch sensitive surface disposed on a bottom side of the empathetic computing device.

46. The empathetic computing device of claim 45, wherein the plurality of sensors further comprises a plurality of infrared sensors configured to determine proximity of the user to the empathetic computing device.

47. A method of interfacing with an empathetic computing system, the method comprising:
receiving sensor data from sensors of an empathetic computing device, wherein the sensor data is generated by user interaction with the empathetic computing device, the user interaction comprising a plurality of interaction units;
receiving contextual information associated with the user interaction;
classifying the sensor data as a sequence of interaction units using stored associations between exemplary sensor data and pre-determined interaction units; and
providing feedback with the empathetic computing device, wherein the feedback is based, at least in part, on the sequence of interaction units and the contextual information, wherein the plurality of user interaction units correspond with sequentially performed user interactions.

48. The method of claim 47, wherein the user interaction comprises natural human actions.

49. The method of claim 47, wherein the receiving sensor data comprises receiving an indication of user proximity, user motion, detected speech, detected facial expression, or ambient condition.

50. The method of claim 47, wherein the contextual information includes, at least in part, information extracted from the sensor data.

51. The method of claim 47, wherein the contextual information includes ambient light level, ambient sound level, ambient temperature, date, time, location of the empathetic computing device, or combinations thereof.

52. The method of claim 47, wherein the providing feedback comprises generating a pattern of lights with a plurality of illumination sources of the empathetic computing device.

53. The method of claim 52, wherein a color of a light in the pattern is based on an interaction unit of the plurality of interaction units of the sequence of interaction units.

54. The method of claim 53, wherein the color is further based on the contextual information associated with a respective interaction unit.

55. The method of claim 47, further comprising, generating, for at least one interaction unit in the sequence, feedback comprising a pattern of lights, wherein the pattern is indicative of content of vocalized speech extracted from the user interaction.

56. The method of claim 47, wherein the providing feedback comprises generating an audible sound with an audio generator of the empathetic computing device, a vibrator of the empathetic computing device, or a combination of the two.

57. The method of any of claim 56, wherein the providing feedback further comprises generating a vibrational response.

58. The method of claim 47, further comprising segmenting the sensor data into a plurality of sensor data sets each associated with respective one of the plurality of interaction units, comparing a first sensor data set of the plurality of sensor data sets with exemplary sensor data to identify a first interaction unit and comparing a second sensor data set of the plurality of sensor data sets with the exemplary sensor data to identify a second interaction unit.

59. The method of claim 47, further comprising storing data sets corresponding to sequences of interaction units associated with a plurality of interaction sessions, and updating an interaction model of the empathetic computing device using the stored data sets.

60. The method of claim 59, further comprising transmitting the data sets to a server, and wherein the updating an interaction model of the empathetic computing device is performed by the server.

61. A method of interfacing with an empathetic computing system, the method comprising:
 receiving sensor data from sensors of an empathetic computing device, wherein the sensor data is generated by user interaction with the empathetic computing device, the user interaction comprising a plurality of interaction units;
 receiving contextual information associated with the user interaction;
 classifying the sensor data as a sequence of interaction units using stored associations between exemplary sensor data and pre-determined interaction units; and
 providing feedback with the empathetic computing device, wherein the feedback is based, at least in part, on the sequence of interaction units and the contextual information, further comprising, generating, for at least one interaction unit in the sequence, feedback comprising a pattern of lights with a plurality of illumination sources of the empathetic computing device, wherein the pattern of lights is indicative of vocalized speech extracted from the user interaction.

62. The method of claim 61, wherein the generating for at least one interaction unit in the sequence, feedback comprising a pattern of lights includes generating two distinct patterns of lights, each corresponding to a different word from the vocalized speech.

63. The method of claim 61, wherein the pattern is further associated with one or more colors indicative of an interaction unit of the plurality of interaction units in the sequence.

* * * * *